US008628197B2

(12) United States Patent
Estevez et al.

(10) Patent No.: US 8,628,197 B2
(45) Date of Patent: Jan. 14, 2014

(54) DISPLAY SYSTEMS AND METHODS FOR MOBILE DEVICES

(71) Applicant: Texas Instruments Incorporated, Dallas, TX (US)

(72) Inventors: Leonardo W. Estevez, Rowlett, TX (US); William R. Krenik, Garland, TX (US); Steven E. Smith, Allen, TX (US); Yoram Solomon, Plano, TX (US); Jose S. Vasquez, Melissa, TX (US); Steven Penn, Denison, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/741,556

(22) Filed: Jan. 15, 2013

(65) Prior Publication Data
US 2013/0128238 A1 May 23, 2013

Related U.S. Application Data

(63) Continuation of application No. 12/196,775, filed on Aug. 22, 2008, now Pat. No. 8,353,598.

(51) Int. Cl.
G03B 21/14 (2006.01)
(52) U.S. Cl.
USPC ................................. 353/39; 353/79; 353/119
(58) Field of Classification Search
USPC ........... 353/39, 71, 72, 79, 119; 359/630–633
See application file for complete search history.

(56) References Cited

U.S. PATENT DOCUMENTS

| 5,712,649 | A | 1/1998 | Tosaki |
| 5,757,339 | A | 5/1998 | Williams et al. |
| 5,886,735 | A | 3/1999 | Bullister |
| 6,637,896 | B2* | 10/2003 | Li et al. ............. 353/119 |
| 6,806,850 | B2* | 10/2004 | Chen ..................... 345/7 |
| 7,690,798 | B2* | 4/2010 | Zakoji et al. ........... 353/79 |
| 7,883,221 | B2 | 2/2011 | Nozaki et al. |
| 2001/0046034 | A1* | 11/2001 | Gold et al. .......... 353/72 |
| 2005/0206583 | A1 | 9/2005 | Hiett |
| 2006/0234784 | A1* | 10/2006 | Reinhorn ......... 455/575.1 |
| 2007/0064311 | A1 | 3/2007 | Park |

OTHER PUBLICATIONS

Electronic Paper, Wikipedia, http://en.wikipedia.org/wiki/Electrophoretic_display, downloaded Aug. 18, 2008, 5 pp., Wikimedia Foundation Inc., St. Petersburg, FL.
Interferometric Modulator Display, Wikipedia, http://en.wikipedia.org/wiki/Interferometric_modulator_display, downloaded Aug. 18, 2008, 1 p., Wikimedia Foundation Inc., St. Petersburg, FL.
The New Jawbone, http://us.jawbone.com, downloaded Aug. 18, 2008, 1 p., AliphCom, San Francisco, CA.

* cited by examiner

Primary Examiner — William C Dowling
(74) Attorney, Agent, or Firm — Warren L. Franz; Wade J. Brady, III; Frederick J. Telecky, Jr.

(57) ABSTRACT

Display systems and methods for mobile devices and mobile devices are disclosed. In one embodiment, a display system for a mobile device is provided. The mobile device is handheld and includes a primary display screen. The display system includes an auxiliary screen and a connecting device coupled to the auxiliary screen and attachable to the mobile device. An image from the mobile device is producible on the auxiliary screen. The display system is removable from the mobile device.

19 Claims, 15 Drawing Sheets

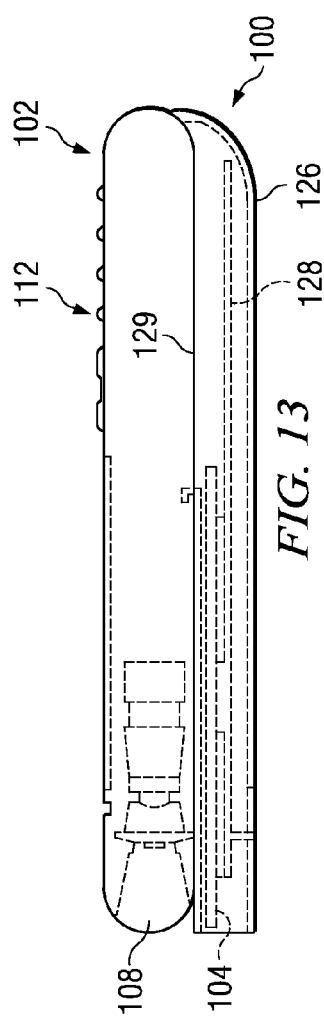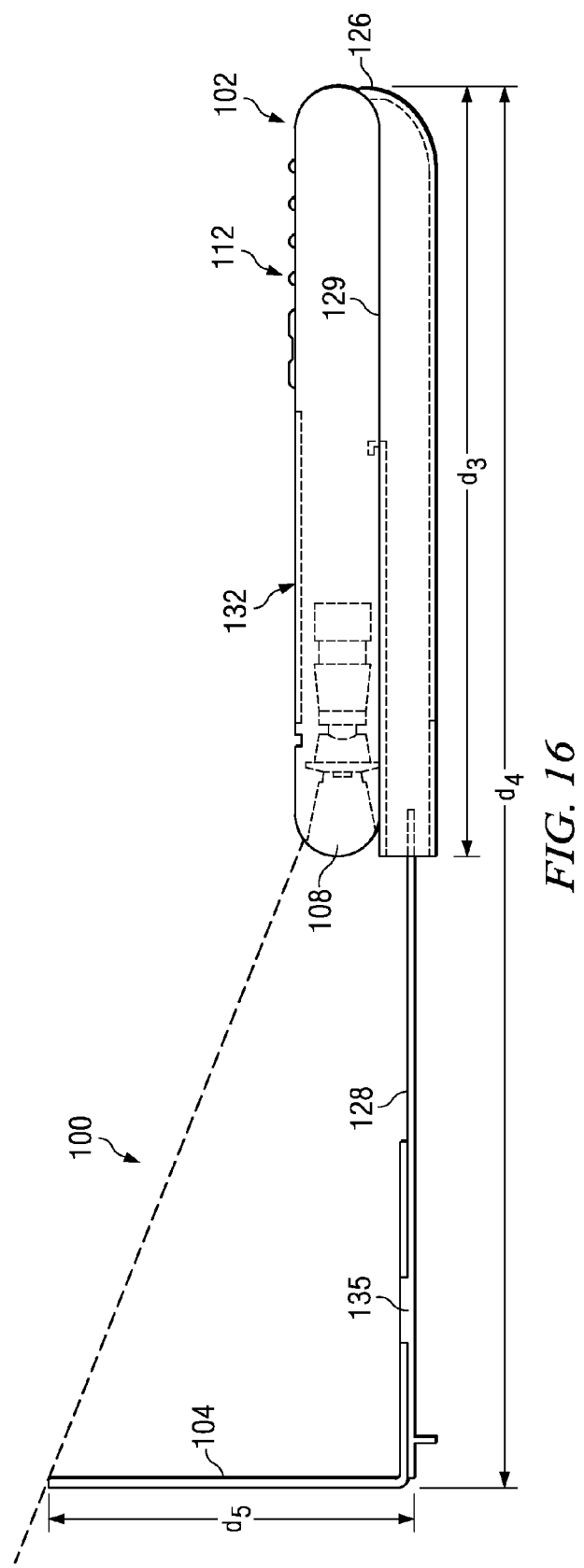

DISPLAY SYSTEMS AND METHODS FOR MOBILE DEVICES

This application is a continuation of application Ser. No. 12/196,775, filed Aug. 22, 2008 (now U.S. Pat. No. 8,353,598), the entirety of which is hereby incorporated by reference.

BACKGROUND

The present invention relates generally to mobile electronic devices and methods, and more particularly to display systems and methods for mobile devices.

Mobile electronic devices such as cellular phones, calculators, and personal digital assistants (PDA's) are popular devices that are widely used. Advances in such mobile devices have included the addition of games or the ability to play music or view movies, for example. Because they are portable and intended for handheld use, mobile devices are generally small. The display screens of the mobile devices are also small and may be difficult to view, particularly in certain lighting or in the presence of glare.

Some recent designs of cellular phones include projection capability and include a small projector that is adapted to project images produced by the mobile devices on a wall. The projectors may use microdisplays such as deformable micromirrors (DMDs) to generate the images on a display plane. However, it may not be feasible to project images on a wall at times, and the images projected on the wall may be dim and difficult to view.

What are needed in the art are improved systems and methods of viewing images produced by cell phones, calculators, and other mobile devices.

SUMMARY

These and other problems are generally solved or circumvented, and technical advantages are generally achieved, by embodiments of the present invention, which comprise novel display systems and methods for mobile devices.

In accordance with one embodiment, a display system for a mobile device that is handheld and includes a primary display screen is provided. The display system includes an auxiliary screen and a connecting device coupled to the auxiliary screen and attachable to the mobile device. An image from the mobile device is producible on the auxiliary screen. The display system is removable from the mobile device.

In accordance with another embodiment, a mobile device includes a mobile electronic device and a display system attached to the mobile electronic device. The mobile electronic device is handheld and includes a primary display screen. The display system is removable and includes an auxiliary screen.

In accordance with yet another embodiment, a method of manufacturing a display system for a mobile device that is handheld and includes a primary display screen is provided. The method includes providing an auxiliary screen, and coupling a connecting device to the auxiliary screen. The connecting device is attachable to the mobile device. An image from the mobile device is producible on the auxiliary screen.

In accordance with another embodiment, a mobile device includes a head-mountable electronic device and a display screen, the display screen being retractable from the head-mountable electronic device. A connecting device is attachable between the head-mountable electronic device and the display screen. An image from the head-mountable electronic device is producible on the display screen.

An advantage of embodiments includes providing several designs for removable display systems for mobile devices that enable a user to view an enlarged image produced by a mobile device. The enlarged images produced on auxiliary screens of the novel display systems permit groups of viewers to share what the user of the mobile device sees on a display screen of a mobile device in some embodiments.

A further advantage is that the display systems include auxiliary screens that are collapsible in some embodiments. The auxiliary screens are lightweight and are foldable, rollable, or pliable in some embodiments, making the display systems portable.

Yet another advantage of the display systems is the hardware requirements for the display systems are modest, providing a cost-effective, inexpensive means of viewing enlarged images from the mobile device.

The foregoing has outlined rather broadly the features and technical advantages of embodiments in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIG. 13 shows a side view of yet another embodiment, wherein the display system is coupleable to the back of the mobile device and includes a connecting device that has an extendable portion coupled to the auxiliary screen;

FIG. 16 shows a side view of the embodiment shown in FIG. 15;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely in display systems for mobile devices. Alternatively, the display systems of embodiments may also be used in other electronic devices and applications, for example.

Embodiments of the present invention achieve technical advantages by providing novel display systems and methods that allow a user of a mobile device to view an enlarged image from the mobile device. Images from the mobile device are transformed to a projected image visible on a projection screen of a display system that is attachable to and detachable from the mobile device, in some embodiments. The display systems are portable and easy to transport.

Several embodiments of the display systems and methods will be described herein, describing different methods of mechanically and optically implementing the invention. The display systems are retractable or collapsible in some embodiments. The auxiliary screens of the display systems may be foldable, rollable, or pliable in some embodiments. In other embodiments, the display systems comprise mobile docking stations that include a support for a mobile device, to be described further herein.

Figure 1:
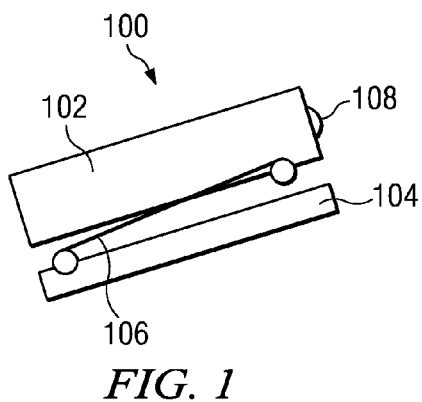
FIG. 1 is a side view of a foldable display system coupled to a back of a mobile device by a connecting device in accordance with an embodiment in a mobile mode.
Figure 2:
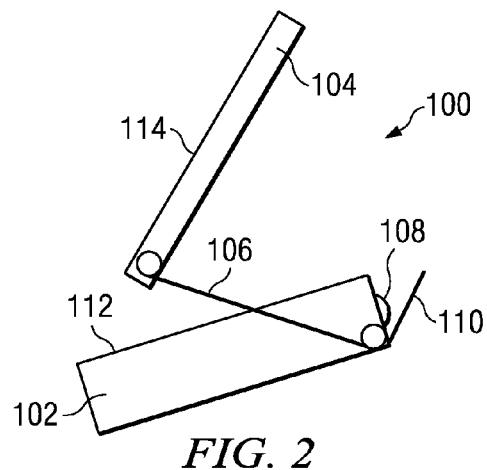
FIG. 2 shows a side view of the display system shown in FIG. 1 in a presentation mode.
Figure 3:
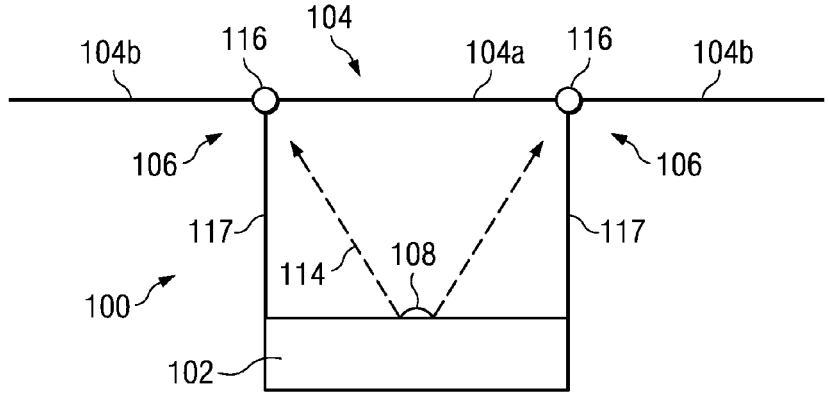
FIG. 3 shows a top view of the display system and mobile device shown in FIG. 2.
Figure 4:
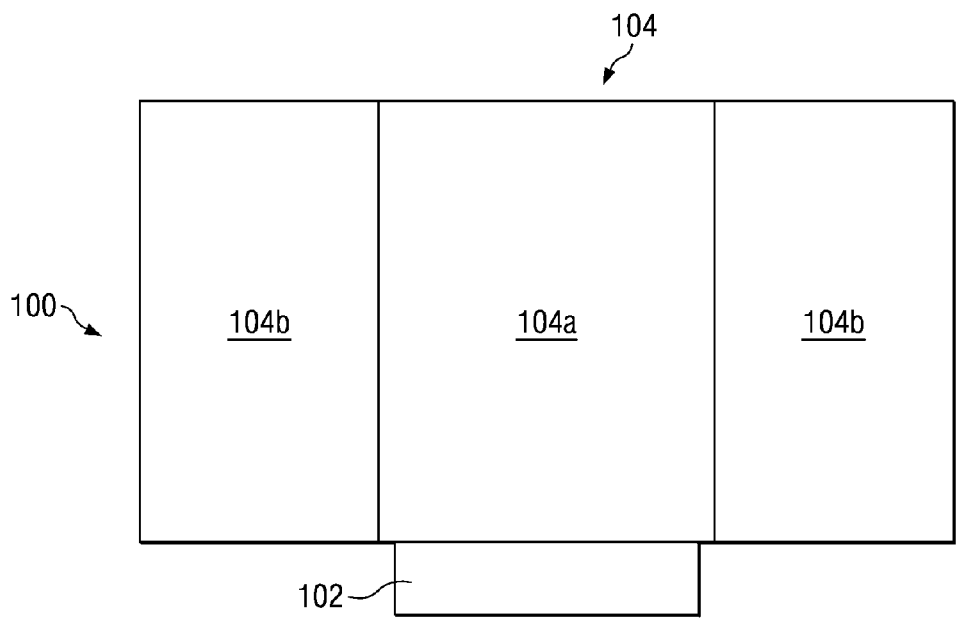
FIG. 4 is a front view of the display system and mobile device of FIGS. 2 and 3.

FIGS. 1 through 4 show several views of an embodiment wherein a display system 100 includes a foldable auxiliary screen 104 that is storable behind a mobile device 102 when not in use. FIGS. 1 and 2 show side views, FIG. 3 shows a top view, and FIG. 4 shows a front view, of the display system 100 coupled to the mobile device 102. The auxiliary screen 104 of the display system 100 is attached to the mobile device 102 by a connecting device 106.

The mobile device 102 comprises a small mobile electronic device that may be held in one hand of a user. The mobile device 102 may be smaller than a human hand, about the same size as a human hand, or slightly larger than a human hand, e.g., about 1½ to 2 times the size of a human hand in some embodiments, as examples. The mobile device 102 may comprise a calculator, a cellular phone, a projection phone, a smart phone, a personal digital assistant (PDA) device, an electronic game system, a digital video disc (DVD) player, or an MP4 player, as examples. Alternatively, the mobile device 102 may comprise other types of handheld electronic devices and may comprise other sizes. In some embodiments, the mobile device may comprise a head-mountable device such as a headset or an earpiece, e.g., that may utilize Bluetooth technology or a cable to communicate to a cellular phone or other type of mobile device 102, to be described further herein. The mobile device 102 includes a primary display screen in some embodiments, as shown at 132 in FIG. 14.

The auxiliary screen 104 may comprise a material comprising a smooth surface, such as plastic, cloth, paper, or other types of materials, as examples. The auxiliary screen 104 may comprise a Lambertian surface in some embodiments, for example. The auxiliary screen 104 may comprise a transparent or translucent material in the embodiment shown in FIGS. 1 through 4. Alternatively, in other embodiments, the auxiliary screen 104 may comprise an opaque material, to be described further herein.

The auxiliary screen 104 comprises a projection screen in some embodiments. In other embodiments, the auxiliary screen 104 may comprise a liquid crystal display, an interference modular display, an electrophoretic display, electronic paper, or other types of displays or screens. The auxiliary screen 104 provides an enlarged display screen that may be used as an alternative to the primary display screen 132 for viewing information or images from the mobile device 102, in some embodiments, for example.

The auxiliary screen 104 of the display system 100 is foldable and collapsible. The auxiliary screen 104 includes a central region 104a comprising substantially the same width as the mobile device 102. The auxiliary screen 104 includes two wing regions 104b coupled to the central region 104a that are adapted to be folded proximate the central region 104a when the display system 100 is not in use. The wing regions 104b may be foldable behind the central region 104a on an opposite side of the auxiliary screen 104 from the connecting device 106, for example. The wing regions 104b may be folded over each other and may be spring loaded to spread after being freed from the folded position.

The connecting device 106 may comprise two or more retractable arms 117, as shown in FIG. 3, disposed on either side of the mobile device 102. One end of each retractable arm 117 is attached to the auxiliary screen 104 and the other end of each retractable arm 117 is attached to the mobile device 102. The connecting device 106 comprises at least two retractable arms 117 in the embodiment shown in FIGS. 1 through 4; alternatively, the connecting device 106 may comprise other types of connecting mechanisms.

The connecting device 106 may include a spring-loaded member 116 coupled to each retractable arm 117. The spring-loaded members 116 are adapted to position the auxiliary screen 104 into a first position close to or adjacent to the mobile device 102, as shown in FIG. 1, and into a second position extended a predetermined distance away from the mobile device 102, as shown in FIG. 2. The connecting device 106 enables the auxiliary screen 104 to be unfolded into an optimal viewing configuration.

When the auxiliary screen 104 is not in use, the auxiliary screen 104 is folded behind or at the back of the mobile device 102, as shown in FIG. 1, wherein the display system 100 is in a "mobile mode." Thus, the display system 100 advantageously is foldable at the back of the mobile device 102 so that the mobile device 102 with the display system 100 attached may be carried in a pocket, briefcase, purse, suitcase, or carrying case, as examples.

FIG. 2 shows a side view of the display system 100 in a "presentation mode," wherein the retractable arms 117 of the connecting device 106 are used to extend the auxiliary screen 104 away from the mobile device 102 by a predetermined distance. The user may pull upward on the retractable arms 117 of the connecting device 106 and/or the auxiliary screen 104 to extend the auxiliary screen 104, for example. The display system 100 is adapted to stop at a position such that a projected image 114 may be viewed on a front side of the auxiliary screen 104 facing the user. In the presentation mode, the auxiliary screen 104 is spaced apart from the mobile device 102, allowing the user to have access to and enable typing on a keyboard 112 of the mobile device 102 while viewing the auxiliary screen 104.

The mobile device 102 may include a projector 108 disposed thereon in some embodiments. In other embodiments, the mobile device 102 may not include a projector 108, and a projector 108 is included as part of the display system 100, for example. The projector 108 may be disposed proximate an end of or other locations on the mobile device 102. The projector 108 may include an optical device such as a DMD device-based projection display system comprising DLP™ technology, which functions as an optical switch or transmitter. The DMD may comprise an optical semiconductor device having an array of thousands or up to millions of micromirrors that may be switched on or off at varying frequencies, forming a digital image. The projector 108 may comprise a pico-projector in some embodiments, for example. Digital images, videos, or graphics from the mobile device 102 are reproducible by the projector 108 and projectable onto the auxiliary screen 104 comprising a projection screen of the display system 100. In other embodiments, the mobile device 102 or display system 100 does not include a projector 108, for example.

The mobile device 102 may include an optional mirror 110 proximate the projector 108, as shown in FIG. 2. If the mobile device 102 does not include a mirror, the display system 100 may include the mirror 110, for example. The mirror 110 is adapted to reflect an image emitted from the projector 108 above the mobile device 102 and onto the back of the auxiliary screen 104, so that the projected image 114 is visible by the user on the front side of the auxiliary screen 104. In the top view shown in FIG. 3, the projected image 114 from the projector 108 has been reflected from the mirror 110 shown in FIG. 2, for example.

The auxiliary screen 104 comprises a size when unfolded that is adapted to display the projected image 114 from the projector 108 on the mobile device 102. The projected image 114 may comprise the same image shown on a primary display screen (not shown in FIGS. 1 through 4; see the primary display screen 132 in FIG. 14) of the mobile device 102, for example.

If the auxiliary screen 104 comprises other types of display screens, such as liquid crystal displays, interference modular displays, electrophoretic displays, electronic paper, or other types of displays or screens, wiring may be included proximate or within the connecting device 106 to electrically couple the mobile device 102 to the auxiliary screen 104, for example. The wiring may comprise a connector and cable adapted to plug into an input/output port of the mobile device 102, for example.

Figure 5:
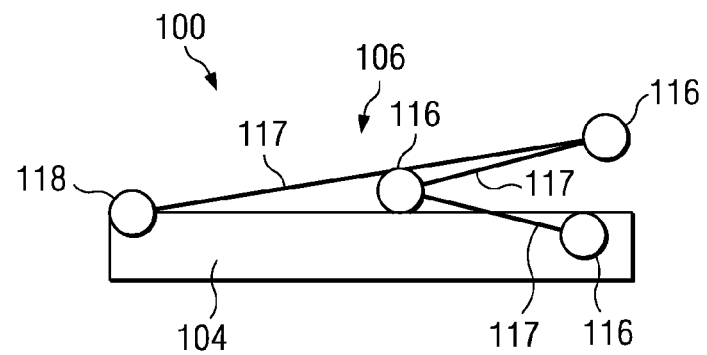
FIG. 5 shows a side view of a portion of a foldable display system in accordance with another embodiment.
Figure 6:
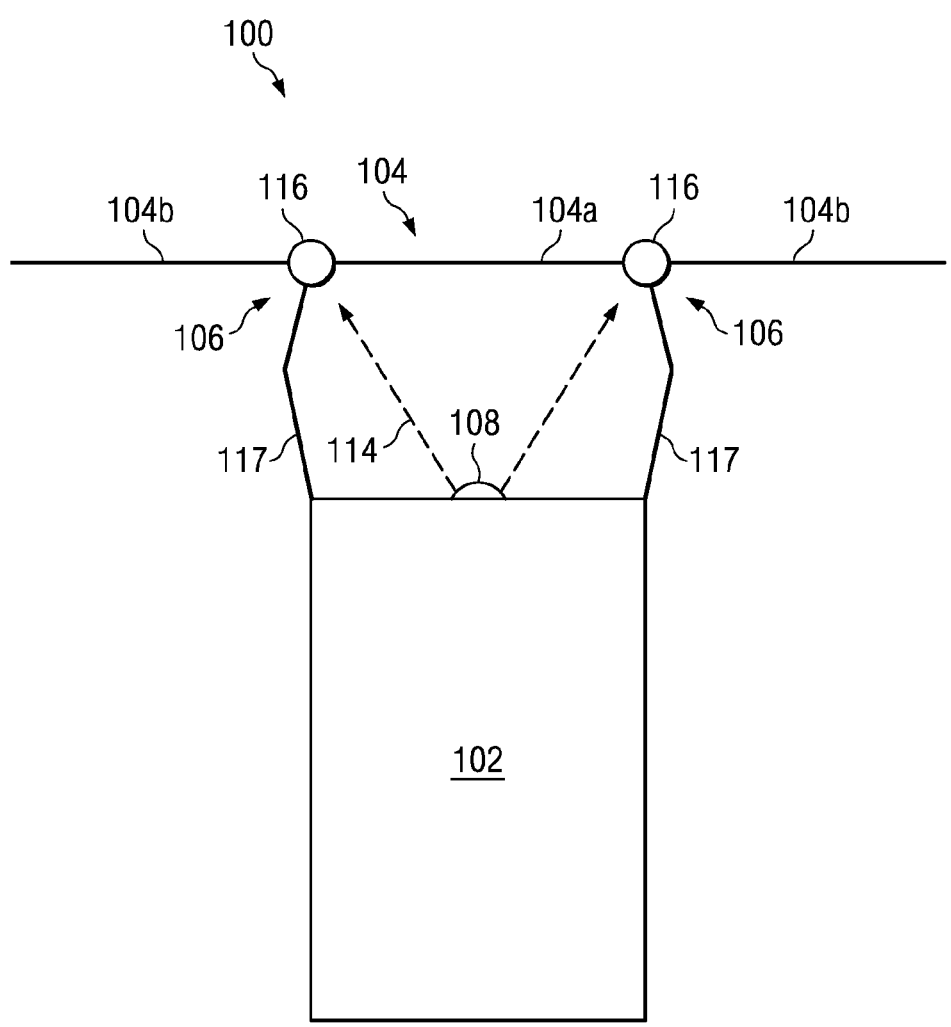
FIG. 6 shows a top view of the display system shown in FIG. 5.

FIG. 5 shows a side view and FIG. 6 shows a top view of a display system 100 having a foldable auxiliary screen 104 in accordance with another embodiment. A portion of, e.g., one half, of the auxiliary screen 104 is shown in FIG. 5. The side view in FIG. 5 of the auxiliary screen 104 shows retractable arms 117 and spring-loaded members 116 of the connecting device 106 coupled to the auxiliary screen 104. The connecting device 106 includes a spring-loaded latch 118 coupled at one end of the auxiliary screen 104. Portions of the connecting device 106 may comprise a torsional spring, wherein the connecting device 106 is spring-loaded and adapted to open when the latch 118 is released. The spring-loaded latch 118 may be released to extend the auxiliary screen 104, for example. A central spring-loaded member 116 when the auxiliary screen 104 is folded extends outward to extend the auxiliary screen 104 away from the mobile device 102. Wing regions 104b, visible in the top view of FIG. 6, may be released after the auxiliary screen 104 is extended.

Figure 7:
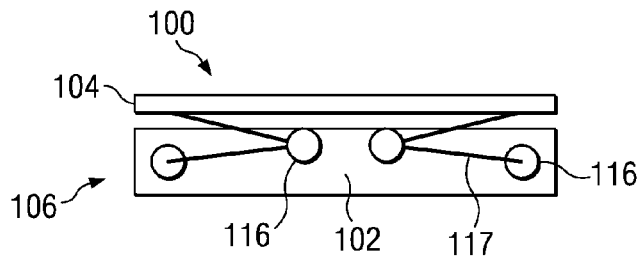
FIG. 7 is a side view of a foldable display system in accordance with yet another embodiment.
Figure 8:
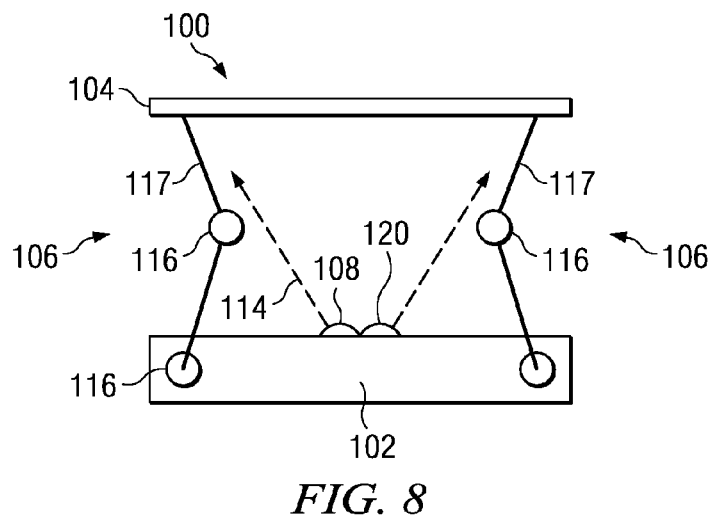
FIG. 8 shows a top view of the display system of FIG. 7 as it is being extended in a presentation mode.
Figure 9:
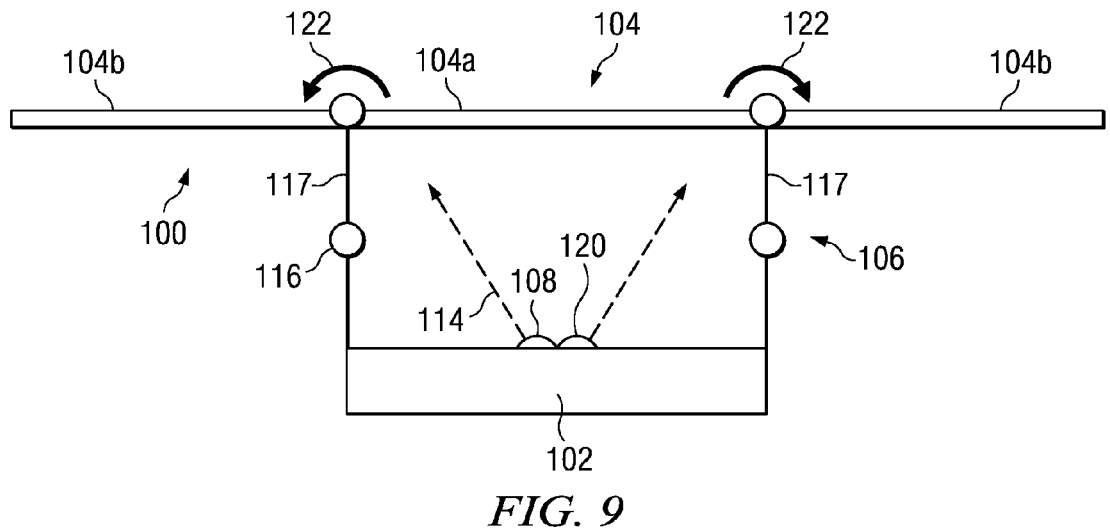
FIG. 9 shows a top view of the display system of FIG. 8 after it has been fully extended.

FIG. 7 is a side view of a display system 100 having a foldable auxiliary screen 104 in accordance with yet another embodiment. FIG. 8 shows a top view of the display system 100 of FIG. 7 as it is being extended in a presentation mode, and FIG. 9 shows a top view of the display system 100 of FIG. 8 after the auxiliary screen 104 has been fully extended. The auxiliary screen 104 may comprise substantially the same width as the mobile device 102 when folded, as shown in FIG. 7. Center spring-loaded members 116 are folded inward when the auxiliary screen 104 is in the mobile mode. The spring-loaded members 116 move outward away from the mobile device 102, extending the retractable arms 117 in the presentation mode.

FIGS. 8 and 9 also show an optional camera 120 that may be included in the display system 100, or alternatively, in the mobile device 102. The camera 120 is adapted to capture images from the auxiliary screen 104, e.g., in embodiments where the auxiliary screen 104 comprises a touch-sensitive screen. Pressure on the auxiliary screen 104 may cause light depolarization that is visible by the camera 120, for example. The optional touch screen feature will be described further herein with respect to FIG. 34, which is a block diagram illustrating the components, function, and operation of a display system including a touch-sensitive auxiliary screen 104. The optional camera 120 may be aligned with the projector 108 and may be adapted to sense the deployment of the auxiliary screen 104, at which point the projected image 114 is appropriately mirrored for rear projection, for example.

After the retractable arms 117 are clear, the wing regions 104b of the auxiliary screen 104 are folded out, as shown in FIG. 9 at 122, to form a large auxiliary screen 104 comprising the central region 104a and the wing regions 104b. For example, in a mobile mode, the wing regions 104b may be folded on the back side of the auxiliary screen 104, on a side facing away from the mobile device 102 in FIG. 9. The wing regions 104b are rotated outwardly, as shown at 122, to unfold the auxiliary screen 104 and position it in a full-size presentation mode.

Note that alternatively, the auxiliary screen 104 may not include wing regions 104b, but rather, the auxiliary screen 104 may comprise a width that is substantially the same as the width of the mobile device 102, in some embodiments. In other embodiments, the wing regions 104b may be included, but the use of them may be optional. The auxiliary screen 104 may be operable with only the central region 104a of the auxiliary screen 104 positioned a predetermined distance away from the mobile device 102, for example.

In the embodiments shown in FIGS. 1 through 9, the connecting device 106 may include an optional rotating latch (not shown) at the bottom of the mobile device 102 that is adapted to release the auxiliary screen 104 after the retractable arms 117 have been extended, enabling the auxiliary screen 104 to be rotated into a field of view of the projector 108.

Figure 10:
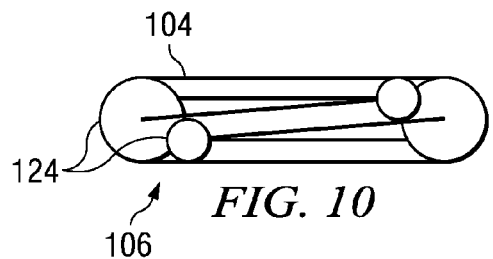
FIG. 10 shows a display system in accordance with another embodiment in a mobile mode, wherein the auxiliary screen is rollable.
Figure 11:
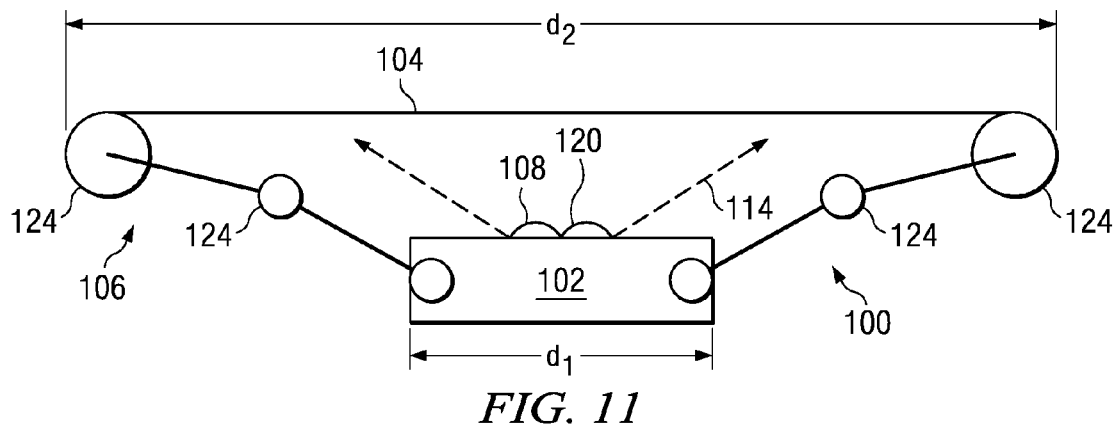
FIG. 11 shows a top view of the display system shown in FIG. 10 in a presentation mode.
Figure 12:
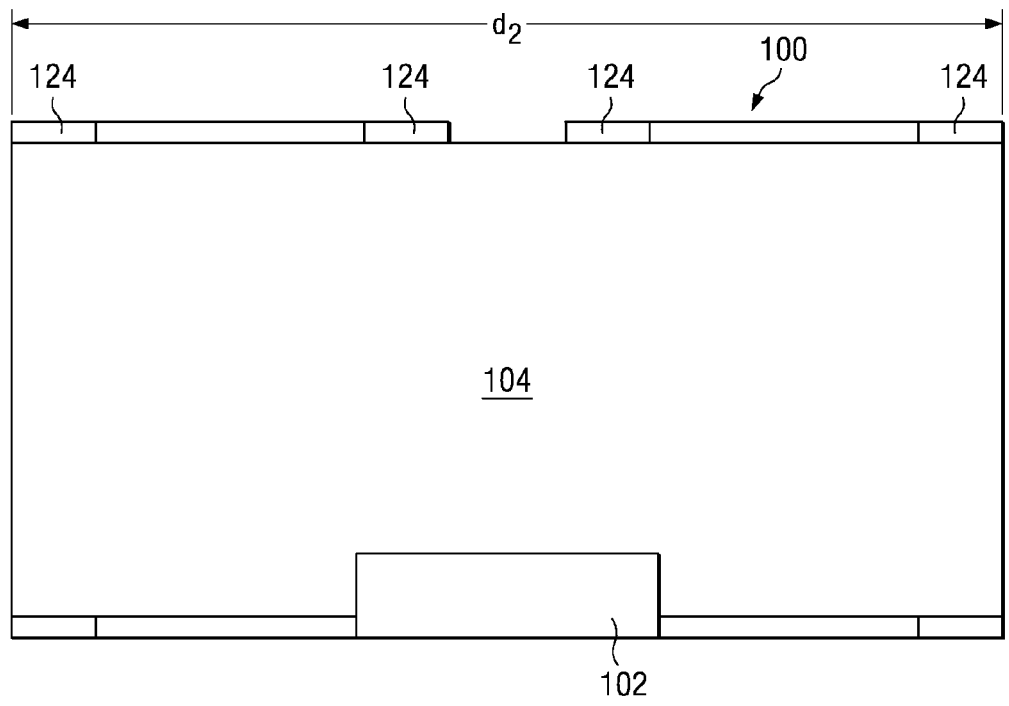
FIG. 12 shows a front view of the display system shown in FIG. 11.

FIG. 10 shows a display system 100 in accordance with another embodiment in a mobile mode, wherein the auxiliary screen 104 is rollable. FIG. 11 shows a top view of the display system 100 shown in FIG. 10 in a presentation mode, and FIG. 12 shows a front view of the display system 100 shown in FIG. 11. The connecting device 106 in this embodiment includes at least one roller 124 adapted to extend outwardly away from the mobile device 102, also extending the auxiliary screen 104 outwardly as the roller 124 unrolls. In the embodiment shown, two rollers 124 are used on each side of the auxiliary screen 104, for example. At least one roller 124 on each side is adapted to function as a torsional spring, wherein when the spring pressure exceeds the roller 124 tension, the auxiliary screen 104 is extended. The auxiliary screen 104 is rolled up on the larger rollers 124 and unrolls when the rollers 124 are extended away from the mobile device 102. The connecting device 106 may also include retractable arms 117 and spring-loaded members 116 as shown in the previous embodiments, for example (not shown).

The width of the mobile device 102 may comprise a dimension $d_1$, and the width of the auxiliary screen 104 in the presentation mode may comprise a dimension $d_2$, wherein dimension $d_2$ is larger than dimension $d_1$. Dimension $d_1$ may comprise about 55 mm in some embodiments, although alternatively, dimension $d_1$ may comprise other values. Dimension $d_2$ may be about 3× dimension $d_1$ in some embodiments. Alternatively, dimension $d_2$ may comprise other values or sizes. Dimensions $d_1$ and $d_2$ may vary as a function of the width of the mobile device 102, a desired size of the projected image, and other parameters, as examples.

In the embodiments shown in FIGS. 5 through 12, if the auxiliary screens 104 comprise projection screens, the display system 100 or mobile device 102 may also include a mirror 110, as shown in FIG. 2, so that the auxiliary screens 104 comprising projection screens may be illuminated from the rear of the projection screens. Alternatively, the display systems 100 may not include a mirror 110, and the display screens 104 may be illuminated from the front of the projection screens. Alternatively, if the auxiliary screens 104 comprise liquid crystal displays, interference modular displays, electrophoretic displays, electronic paper, or other types of displays or screens, the auxiliary screens 104 may be electrically coupled to the mobile devices 102 for illumination of the auxiliary screens 104, for example.

Figure 14:
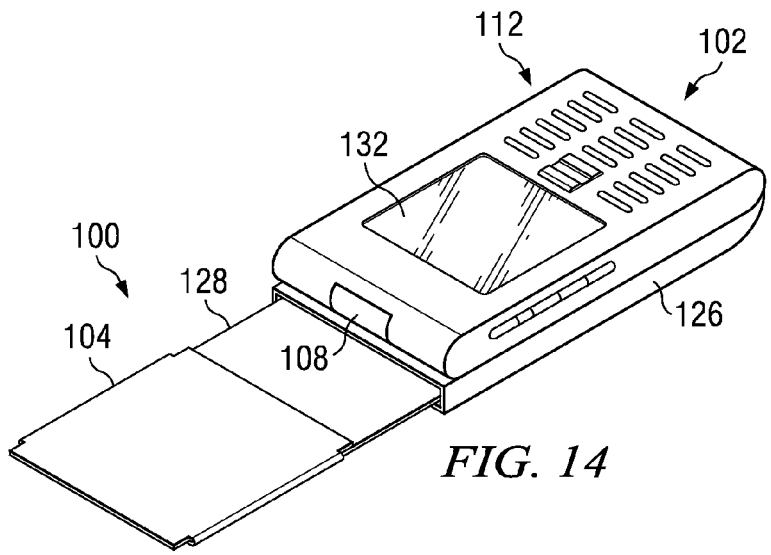
FIG. 14 shows a perspective view of the display system shown in FIG. 13 as the auxiliary screen is being extended.
Figure 15:
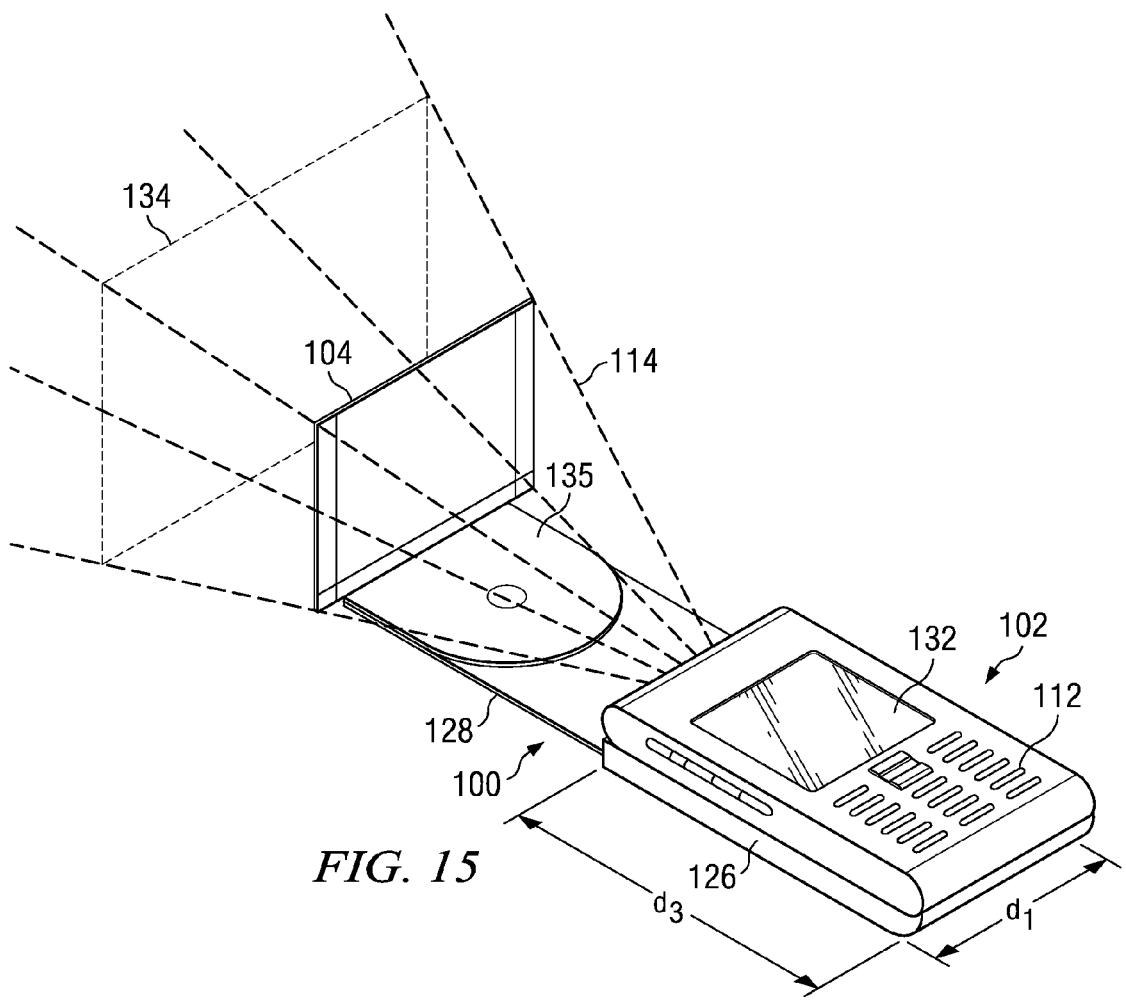
FIG. 15 shows a perspective view of the display system shown in FIG. 14 after the auxiliary screen has been extended in front of the mobile device.

FIG. 13 shows a side view of yet another embodiment, wherein the display system 100 is coupleable to the back of the mobile device 102 and has an extendable member 128 coupled to the auxiliary screen 104. FIG. 14 shows a perspective view of the display system 100 shown in FIG. 13 as the auxiliary screen 104 is being extended. FIG. 15 shows a perspective view of the display system 100 shown in FIG. 14 after the auxiliary screen 104 has been extended in front of the mobile device 102 by the extendable member 128 and pivoted upwardly to position the auxiliary screen 104 to be positioned at about a ninety degree angle to the mobile device 102. FIG. 16 shows a side view of the embodiment shown in FIG. 15.

The display system 100 in this embodiment includes a canister 126 that is adapted to house the extending member 128 and the auxiliary screen 104. The canister 126 may be adapted to fit proximate a battery door 129 of the mobile device 102 in some embodiments. The canister 126 may comprise plastic or other types of material, and may include grooves on interior side surfaces for containing and guiding the extending member 128 and the auxiliary screen 104.

The mobile device 102 may comprise a width or dimension $d_1$ and a length or dimension $d_3$, as shown in FIG. 16. The canister 126 may comprise substantially the same width and length of the mobile device 102. The width or dimension $d_1$ of the mobile device 102 and canister 126 may be about 64 mm. The length or dimension $d_3$ of the mobile device 102 and canister 126 may comprise about 115 mm, as examples. The extended length of the display system 100 may comprise a length or dimension $d_4$ of about 215 mm, in some embodiments. The extended length of the display system 110 may comprise about 2× the length or dimension $d_3$ of the mobile device 102 and canister 126 in some embodiments, for example. Alternatively, dimensions $d_1$, $d_3$, and $d_4$ may comprise other values.

The height or dimension $d_5$ of the auxiliary screen 104 may comprise about 42.6 mm in some embodiments. The auxiliary screen 104 may comprise a width or dimension $d_1$ of about 64 mm, resulting in a diagonal dimension of the auxiliary screen 104 of about 76.9 mm, for example. Alternatively, dimensions $d_1$ and $d_5$ may comprise other values. In some embodiments, the auxiliary screen 104 may comprise a size and may be positioned such that it provides about 100% offset projection of the projected image 114 from the projector 108 on the mobile device 102, for example. The auxiliary screen 104 is positioned in front of the projector 108 to intercept the projected image 114, which may originally be intended to be projected on a wall to produce an image 134 shown in phantom in FIG. 15, for example. The auxiliary screen 104 may alternatively comprise other dimensions.

The extendable member 128 may include a rotatable portion 135, for example. The auxiliary screen 104 may be coupled to the rotatable portion 135 of the extendable member 128. When the auxiliary screen 104 is extended, the extendable member 128 may be adapted to rotate the auxiliary screen 104 into a viewing position and then pivot the auxiliary screen 104 upward, to be positioned substantially perpendicular to the plane that the canister 126 resides in, e.g., along the length or dimension $d_3$. The keyboard 112 and the primary display screen 132 of the mobile device 102 are advantageously visible and accessible when the display system 100 is in use.

Figure 17:
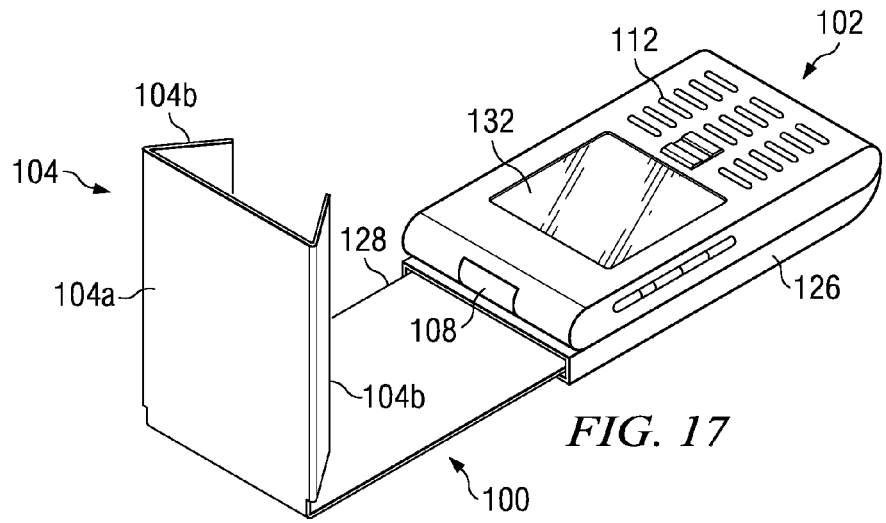
FIG. 17 shows a perspective view of another embodiment, wherein the auxiliary screen of the display system includes foldable flaps.
Figure 18:
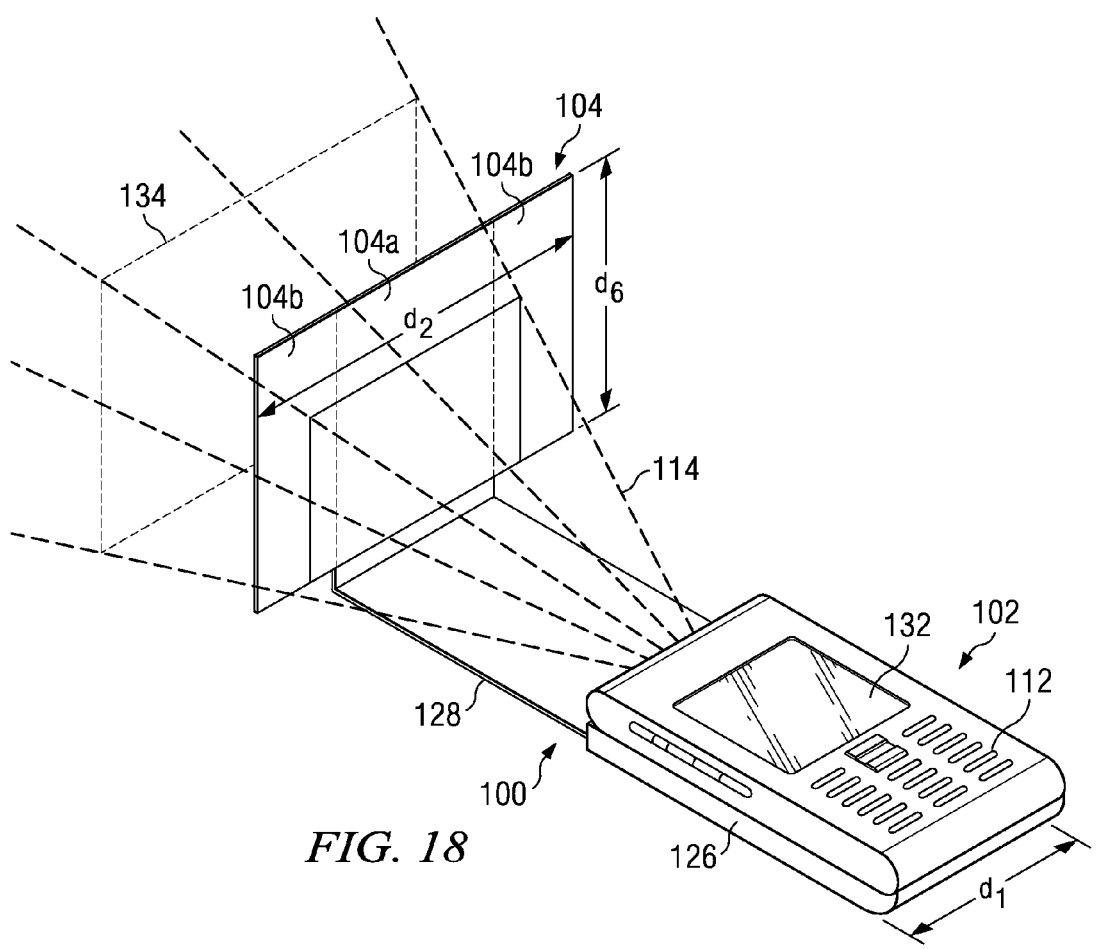
FIG. 18 shows a front perspective view of the display system shown in FIG. 17.

The embodiment shown in FIGS. 13 through 16 may also comprise an auxiliary screen 104 with foldable flaps or wing regions 104b, as shown in FIGS. 17 and 18 in perspective views. This embodiment provides a larger projected image 114 to be viewed by a user of the mobile device 102 and other people proximate the mobile device 102. The foldable flaps may comprise wing regions 104b as described for the embodiments shown in FIGS. 3, 4, 6, and 9, for example. The auxiliary screen 104 slides out of the canister 126, pivots up and unfolds into the viewing position at a substantially ninety degree angle to the mobile device 102.

The size of the auxiliary screen 104 comprises an enlarged height or dimension $d_6$ in this embodiment, and a width or dimension $d_2$ that is also enlarged. Dimension $d_6$ may comprise about 104 mm, and dimension $d_2$ may comprise about 65 mm, wherein a diagonal dimension of the auxiliary screen 104 comprises about 122.6 mm, as an example. As another example, dimension $d_6$ of the auxiliary screen 104 may comprise about 85 mm, dimension $d_2$ may comprise about 55 mm, wherein a diagonal dimension of the auxiliary screen 104 comprises about 101.2 mm. Alternatively, dimension $d_2$, dimension $d_6$, and the diagonal dimension of the auxiliary screen 104 may comprise other values.

In the embodiments shown in FIGS. 13 through 16 and FIGS. 17 and 18, the auxiliary screen 104 may comprise a material that is adapted to reject ambient light, for example, for optimal viewing capability. The auxiliary screen 104 may be opaque in these embodiments, because the auxiliary screen 104 is illuminated from the front, for example.

Figure 19:
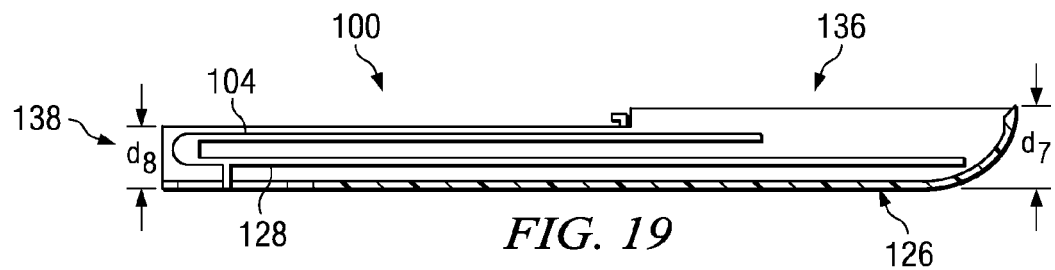
FIG. 19 shows a side view of a canister for the display system shown in FIGS. 13 through 18.
Figure 20:
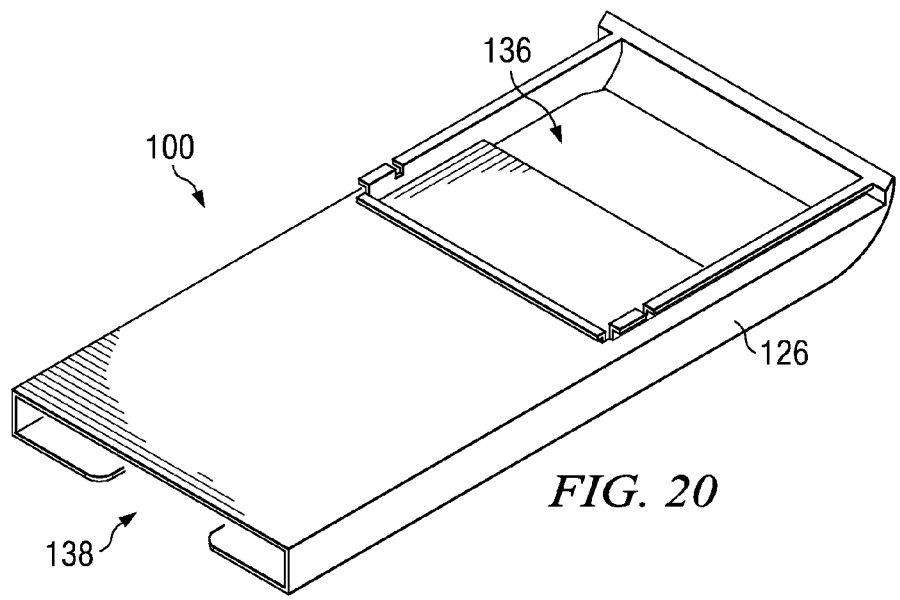
FIG. 20 shows a perspective view of the canister shown in FIG. 19.
Figure 21:
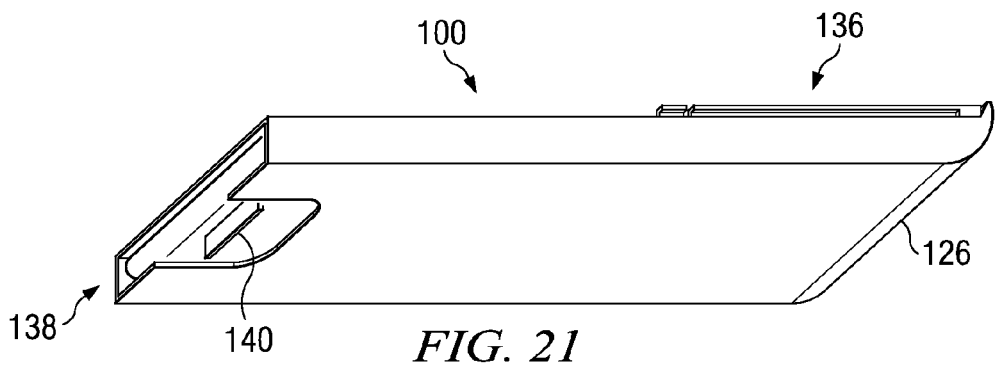
FIG. 21 shows a perspective view of a display system in accordance with an embodiment, wherein a finger tab is disposed on an extendable portion of the connecting device.

FIG. 19 shows a side view of a canister 126 for the display systems 100 shown in FIGS. 13 through 18. FIGS. 20 and 21 show perspective views of the canister 126 shown in FIG. 19. The canister 126 may comprise a larger height or dimension $d_7$ proximate one end than a height or dimension $d_8$ proximate the other end. Dimension $d_7$ may comprise about 10 mm and dimension $d_8$ may comprise about 7 mm or less in some embodiments, for example. Alternatively, dimensions $d_7$ and $d_8$ may comprise other values. The combined height of the canister 126 and the mobile device 102 coupled to the canister 126 may comprise about 20 mm in some embodiments, as an example.

The canister 126 of the display system 100 may include an optional accommodating fit region 136 for a battery door 129 (see FIG. 13) of a mobile device 102, as shown in FIG. 20 in a perspective view. The accommodating fit region 136 of the canister 126 may comprise an aperture and raised edge regions adapted to couple to the battery door 129 or battery door opening of the mobile device 102, as examples. The accommodating fit region 136 may comprise a shape identical to the battery door 129 of the mobile device 102, so that the display system 100 may be attached to the mobile device 102 without requiring modifications to the mobile device 102 or without requiring extra parts or components, for example.

The accommodating fit region 136 may also be adapted to couple to other regions of a mobile device 102, for example, not shown.

The canister 126 includes an opening 138 at one end through which the extendable portion 128 and auxiliary screen 104 pass when extending or retracting the extendable portion 128 and auxiliary screen 104. The opening 138 may be covered with an optional living hinge rubber door (not shown) which protects the display system 100 from debris that may enter into the opening 138, for example.

The lower portion of the canister 126 proximate the opening 138 may comprise a notch, as shown in the perspective view in FIG. 21, and a finger tab 140 or other mechanism may be disposed on a lower surface of the extendable portion 128 and/or the auxiliary screen 104 proximate the notch. The finger tab 140 may be used to pull out the extendable portion 128 and/or the auxiliary screen 104 from the opening 138 of the canister 126.

Figure 22:
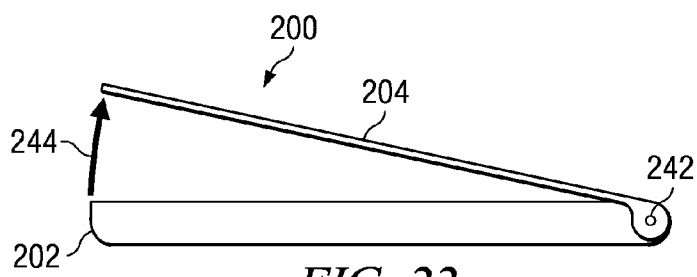
FIG. 22 shows a side view of a mobile device having a cover that comprises an auxiliary screen in accordance with an embodiment.
Figure 23:
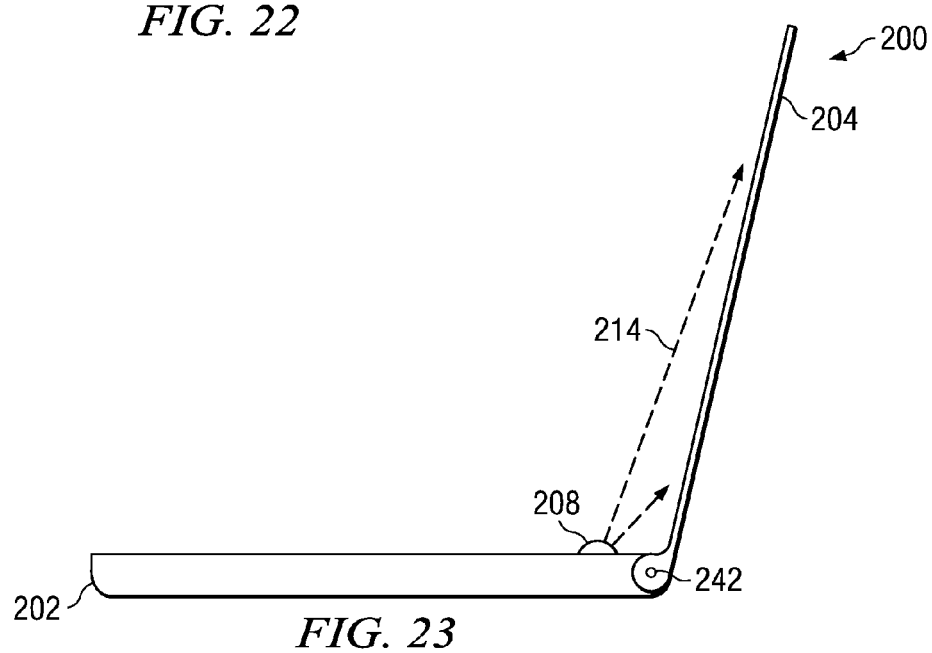
FIG. 23 shows a side view of the embodiment shown in FIG. 22, with the cover open and positioned to function as a projection screen.
Figure 24:
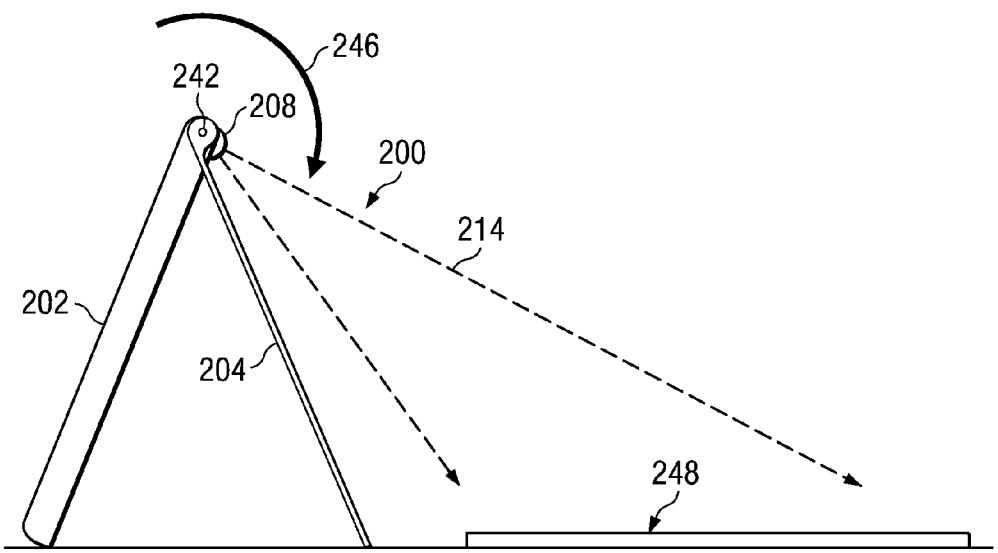
FIG. 24 shows a side view of the embodiment shown in FIGS. 22 and 23, wherein the cover is rotatable to be positioned as a stand and an image is projectable from rotating optics to a horizontal surface proximate the mobile device.

FIGS. 22 through 24 show a mobile device 202 wherein the display system 200 has a cover that comprises an auxiliary screen 204 in accordance with an embodiment. Like numerals are used for the various elements that were used to describe FIGS. 1 through 21. To avoid repetition, each reference number shown in FIGS. 22 through 24 is not described again in detail herein. Rather, similar components and materials are preferably used for the various components and elements x00, x02, x04, etc. . . . shown as were used to describe FIGS. 1 through 21, where x=1 in FIGS. 1 through 21 and x=2 in FIGS. 22 through 24.

FIG. 22 shows a side view of the mobile device 202 having a cover that comprises the auxiliary screen 204. The cover/auxiliary screen 204 is attached to the mobile device 202 by a hinge 242. The hinge 242 permits the cover/auxiliary screen 204 to be opened upwards, as shown at 244, from an end of the mobile device 202 opposite the hinge 242. FIG. 23 shows a side view of the embodiment shown in FIG. 22, with the cover/auxiliary screen 204 opened and positioned to function as the auxiliary screen 204. The mobile device 202 or display system 200 may include rotating optics in this embodiment, to rotate a projected image 214 to a desired position, either on the cover/auxiliary screen 204, on a horizontal surface, or on surfaces positioned in other orientations, e.g., vertical, non-vertical, or non-horizontal surfaces. The rotating optics may be coupleable proximate the mobile device 202, for example. The rotating optics may also be integral to the projector 208, for example, as shown in FIGS. 22 through 24.

The cover/auxiliary screen 204 advantageously protects the primary display screen and keyboard of the mobile device 202 when the mobile device 202 is not in use. The cover/auxiliary screen 204 also opens vertically to function as an image plane for the mobile device 202.

FIG. 24 shows a side view of the embodiment shown in FIGS. 22 and 23, wherein the cover/auxiliary screen 204 optionally may be further rotatable, as shown at 246, to be positioned as a stand. Thus, the cover/auxiliary screen 204 may be used to position the mobile device 202 in an upright position. The rotating optics of the projector 208 are used to rotate the projected image 214 even further than in FIG. 23. The projected image 214 is projected from the projector 208 including the rotating optics to a horizontal surface 248 proximate the mobile device 202, e.g., on a table or desk.

The embodiment shown in FIGS. 22 through 24 may be advantageous in applications where it is desirable to trace the projected image 214. For example, if the mobile device 202 comprises a graphics calculator, the projected image 214 may comprise a graph that the user of the mobile device 202 may trace. Alternatively, a light-sensitive paper may be placed on the horizontal surface 248, and a hard copy of the projected image 214 may be produced by projecting the projected image 214 on the light-sensitive paper, for example.

In an alternate embodiment, the rotating optics of the projector 208 may also be used to project the projected image 214 onto a vertical surface, such as a wall or a separate vertically oriented auxiliary screen or object, not shown. Thus, in this embodiment, a user has several options of projection surfaces, including the cover/auxiliary screen 204 that is attached to the mobile device 202, vertically or horizontally oriented surfaces, or surfaces oriented in other directions.

Note that in the embodiment shown in FIGS. 22 through 24, the display system 200 may include the projector 208 and/or the rotating optics, for example. Alternatively, the projector 108 and/or the rotating optics may be a part of the mobile device 202, e.g., the mobile device 202 may have image projection capability. Portions of the display system 200 such as the hinge 242, the cover/auxiliary screen 204, and/or the projectors 208 may be integral to the mobile device 202, or they may be accessories that are added and installed by the user after purchasing the mobile device 202. The display system 200 may comprise an after-market accessory, as an example.

Figure 25:
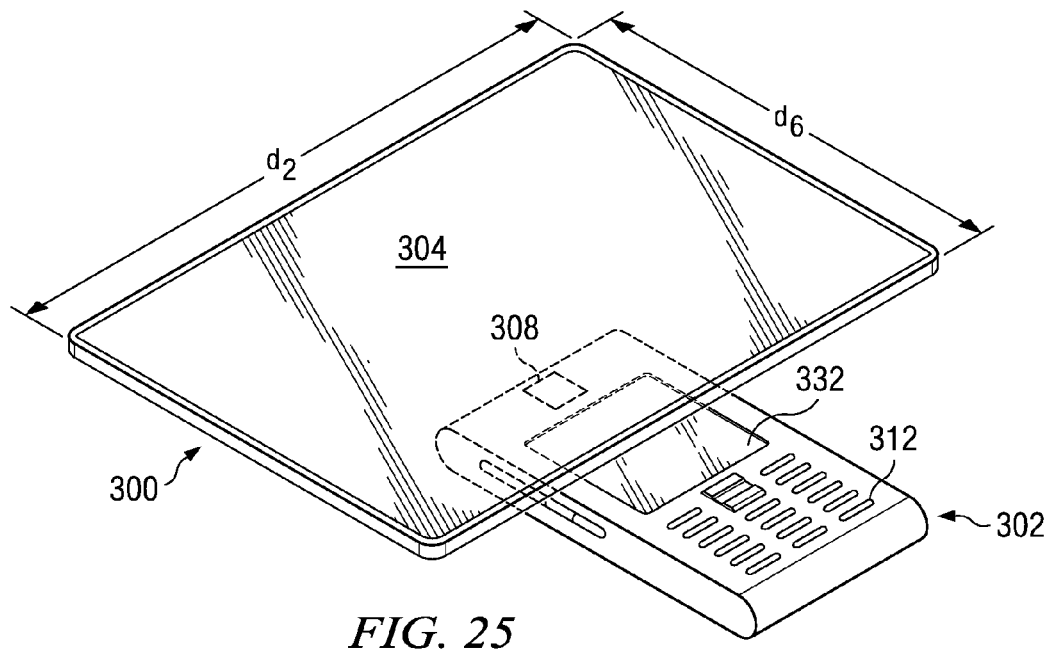
FIG. 25 shows a perspective view of a display system in accordance with another embodiment, wherein the display system comprises an auxiliary screen attachable proximate a projector of the mobile device.
Figure 26:
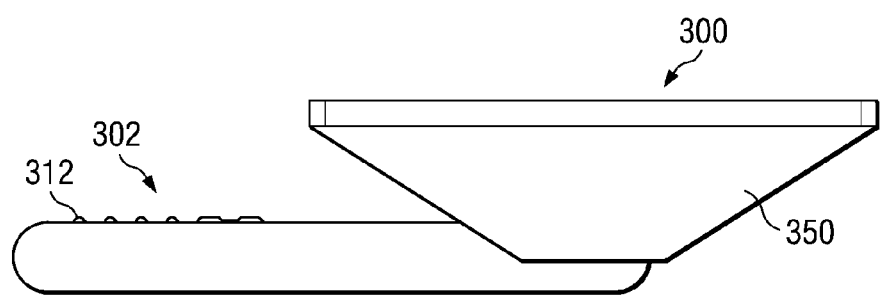
FIG. 26 shows a side view of the embodiment shown in FIG. 25.

FIGS. 25 through 29 show embodiments wherein the auxiliary screen 304 of a display system 300 is collapsible and comprises a pliable or bendable housing 350. Again, like numerals are used to refer to the various elements shown in FIGS. 25 to 29 as were used to describe the previous figures, and to avoid repetition, each element is not described again herein. FIG. 25 shows a perspective view of the display system 300 attached to a mobile device 302. The display system 300 comprises an auxiliary screen 304 attachable proximate a projector 308 of the mobile device 302. FIG. 26 shows a side view of the embodiment shown in FIG. 25.

Figure 27:
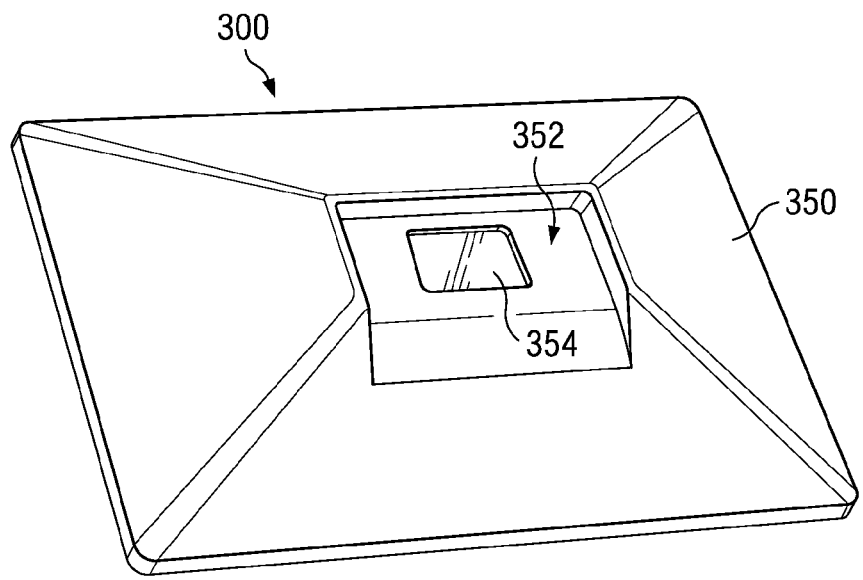
FIG. 27 shows a perspective view of the back of the display system shown in FIGS. 25 and 26.
Figure 28:
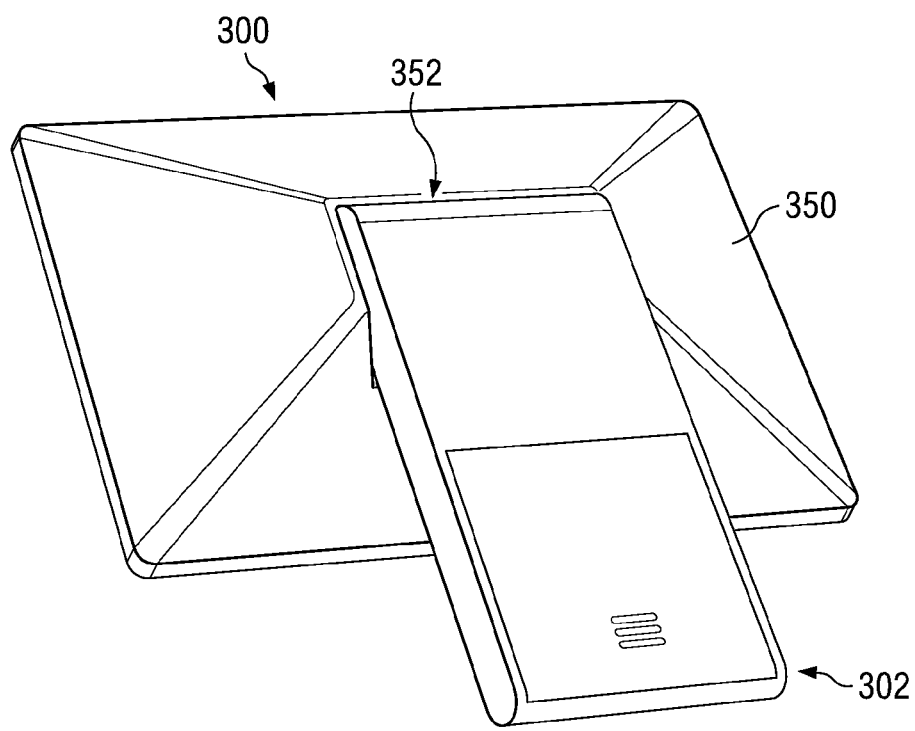
FIG. 28 shows a perspective view of the back of the display system shown in FIG. 27 coupled to a mobile device.

FIG. 27 shows a perspective view of the back of the display system 300 shown in FIGS. 25 and 26. The housing 350 of the display system 300 includes a connecting region 352 and a transparent region 354 through which an image projected from projection optics 308 of the mobile device 302 is transmittable. FIG. 28 shows a perspective view of the back of the display system 300 shown in FIG. 27 coupled to a mobile device 302.

The display system 300 comprises an auxiliary screen 304 that is collapsible and bendable. The display system 300 includes a bendable and pliable housing 350 that functions as a connecting device of the auxiliary screen 304 to the mobile device 302. The housing 350 may comprise rubber or plastic, as examples, although other materials may also be used. The display system 300 is adapted to be collapsed and held or transported in a pocket, purse, or briefcase, as examples, and the pliable material of the housing 350 minimizes storage volume. The housing 350 may comprise four planes that are angled downward towards from the auxiliary screen 304 to the mobile device 302 at about a 75 degree angle or less, for example. The housing 350 may comprise a collapsible, deflectable, rubber material comprising a geometry similar to that of a plunger in some embodiments, as another example.

The auxiliary screen 304 may comprise a width or dimension $d_2$ and a height or dimension $d_6$ in a top view, as shown. Dimension $d_2$ may comprise about 150 mm and dimension $d_6$ may comprise about 100 mm in this embodiment, as examples, although alternatively, the auxiliary screen 304 may comprise other dimensions. The housing 350 may comprise a thickness in a top view of the display system 300 of about 23 to 30 mm in some embodiments, although alternatively, the housing 350 may comprise other dimensions.

The housing 350 comprises a connecting region 352 that may comprise a notch molded or formed into the material of the housing 350. The connecting region 352 is adapted to receive or accommodate an end of the mobile device 302. The connecting region 352 may comprise an over-molded region in the housing 350 that provides mechanical connection to the mobile device 302. The mobile device 302 is mounted to the back of the housing 350 at the connecting region 352. The notch of the connecting region 352 may comprise a width about the same as the width of the mobile device 302, for example.

Figure 29:
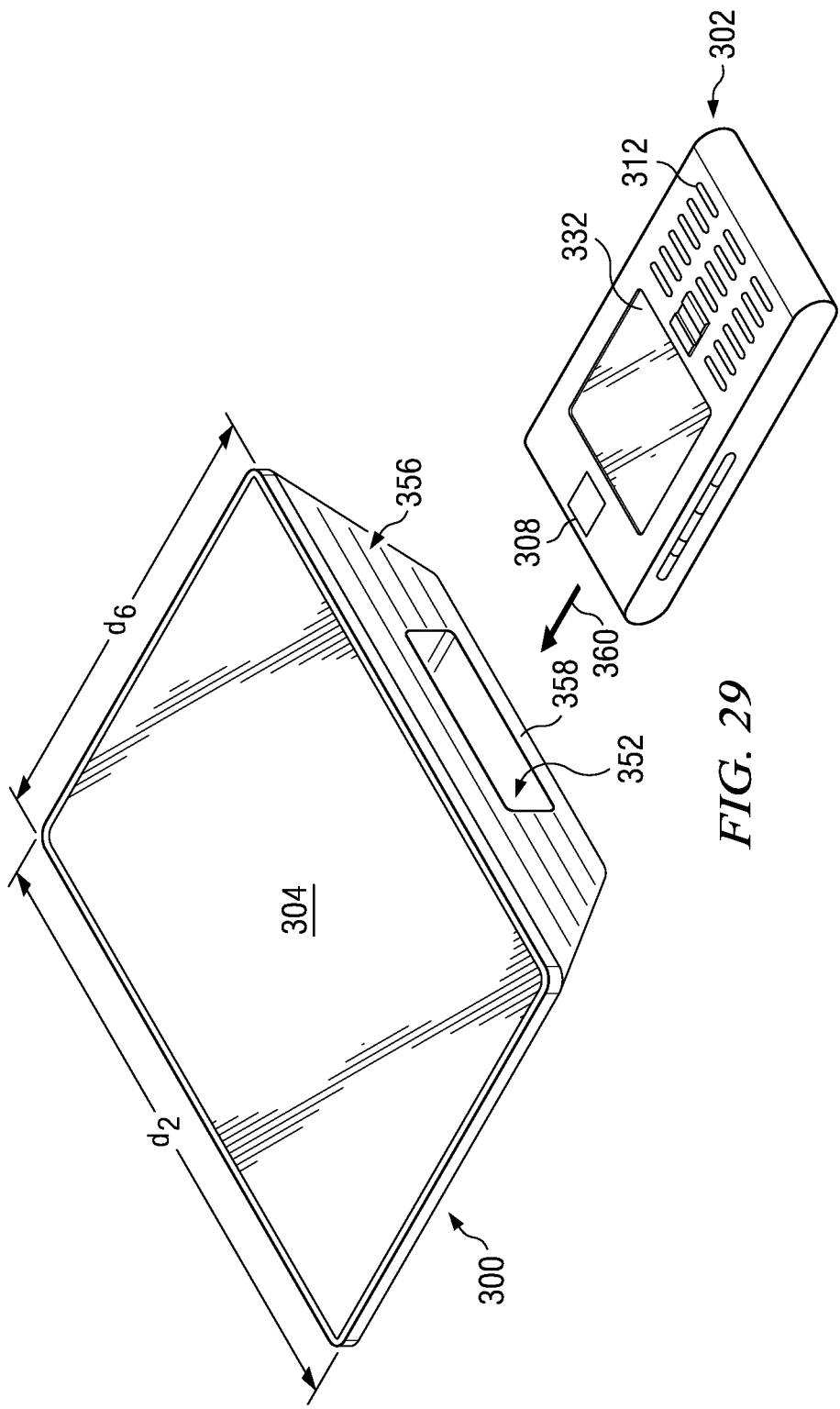
FIG. 29 shows another embodiment wherein the display system includes a bellowed region on a bottom portion thereof.

FIG. 29 shows another embodiment, wherein the display system 300 includes a housing 350 including a backing material comprising a bellowed region 356 on a bottom portion thereof. The bellowed region 356 comprises a plurality of bellows or grooves on at least a portion of the housing 350 that improves and enhances the pliability of the backing material 350, making the display system 300 more easily collapsible. The bellowed region 356 may allow the display system 300 to be substantially flattened, for example. The embodiment of FIG. 29 also illustrates an optional molded feature 358 on the connecting region 352 that is adapted to align the mobile device 302 to the display system 300. When inserting the mobile device 302 (e.g., as shown at 360) into the opening formed by the connecting region 352 and the molded feature 358, the connecting region 352 and molded feature 358 support and position the display system 300 in the Z axis, e.g., in the direction of the upward-downward movement of the bellowed region 356 of the housing 350.

The keyboard 312 of the mobile device 302 is visible to the user and is accessible in the embodiments shown in FIGS. 25 to 29 when the display system 300 is attached to the mobile device 302. At least a portion of the primary display screen 332 of the mobile device 302 may be blocked from view by the display system 300 in these embodiments, which is not problematic, because images from the primary display screen 332 of the mobile device 302 are visible on the auxiliary screen 304 of the display system 300. In other embodiments, such as the embodiments shown in FIGS. 1 through 24, the primary display screen 132 of the mobile device 102 may be viewed simultaneously while the auxiliary display screens 104 or 204 are viewed, for example.

In the embodiments shown in FIGS. 25 to 29, the display system 300 is adapted to be snapped onto or slid over the mobile device 302. The auxiliary screen 304 may be adapted to be manually or automatically unfolded. The display system 300 may include a mirror (not shown) adapted to reflect a projected image from the projector 308 of the mobile device 302 onto an optical circuit (also not shown), which is then reproduced on the auxiliary screen 304.

FIGS. 30 through 33 show embodiments wherein the display system 400 includes a support 464 for the mobile device 402 and wherein the auxiliary screen 404 is part of a docking station 462 for the mobile device 402. Portions of the docking station 462 function as connecting devices to couple the mobile device 402 to the auxiliary screen 404 in this embodiment. Again, like numerals are used to refer to the various elements that were used to describe the previous figures, and to avoid repetition, each element is not described again herein.

Figure 30:
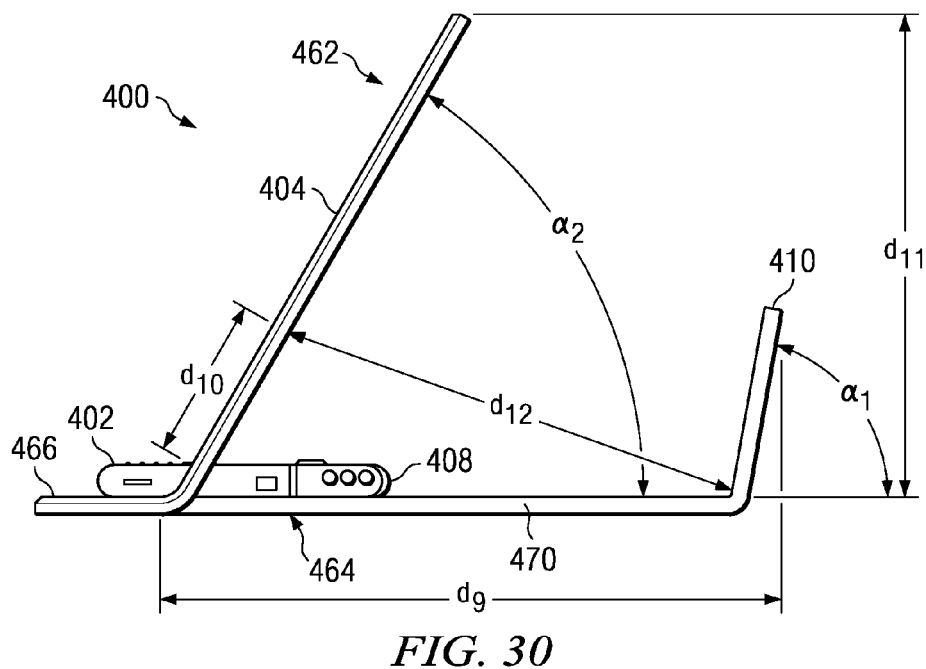
FIG. 30 shows a side view of yet another embodiment, wherein the display system comprises a docking station for the mobile device.
Figure 31:
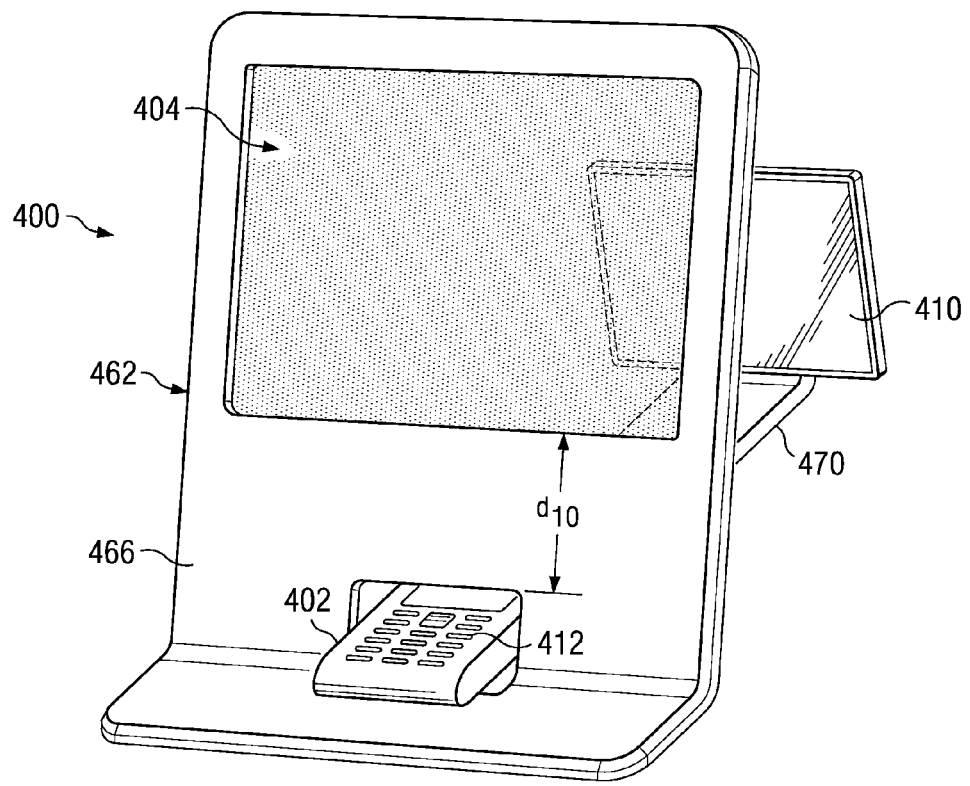
FIG. 31 shows a perspective front view of the embodiment shown in FIG. 30.

FIG. 30 shows a side view of an embodiment wherein the display system 400 comprises a mobile docking station 462 for the mobile device 402. FIG. 31 shows a perspective front view of the embodiment shown in FIG. 30. The docking station 462 may include a front portion 466 comprising a molded plastic or other material having an auxiliary screen 404 disposed thereon for viewing projected images from the mobile device 402. Images are projected from a projector 408 of the mobile device 402 onto a mirror 410 of the display system 400 that reflects the images onto the back of the auxiliary screen 404. The mirror 410 is coupled to the docking station 462 by a connecting member 470. The mirror 410 and the connecting member 470 may be foldable so that the docking station 462 is mobile and requires less space for storage and transport, for example. Alternatively, the auxiliary screen 404 may comprise other types of displays and screens that are electrically coupled to the mobile device 402, as described for the other embodiments herein.

The docking station 462 includes a support 464 for the mobile device 402 adapted to keep the mobile device 402 stationary. The support 464 may be adapted to stabilize the mobile device 402 when a user types on the keyboard 412 of the mobile device 402, for example. The support 464 may be an opening in the docking station 462 on which the mobile device 402 may be inserted. The support 464 may comprise a portion of the front portion 466 and/or the connecting member 470 of the docking station 462, for example. When inserted into the support 464, the keyboard 412 of the mobile device 402 extends out from and is exposed, providing access to the keyboard 412 of the mobile device 402 during use.

The distance or dimension $d_9$ from a lower portion of the front portion 466 of the docking station 462 to the mirror 410 may comprise about 200 mm, as an example. The front portion 466 may include a region between the mobile device 402 and the auxiliary screen 404 comprising a dimension $d_{10}$ of about 20 mm, as an example. The height or dimension $d_{11}$ of the docking station 462 above a horizontal surface that the docking station 462 is placed upon may comprise about 150 mm, as another example. A distance or dimension $d_{12}$ from a lower portion of the auxiliary screen 404 to the mirror 410 may comprise about 187 mm in some embodiments, as an example. Alternatively, dimensions $d_9$, $d_{10}$, $d_{11}$, and $d_{12}$ may comprise other values.

The angle $\alpha_1$ of the mirror 410 to the horizontal surface may comprise about 80 degrees, and the angle $\alpha_2$ of the front portion 466 of the docking station 462 to the horizontal surface may comprise about 60 degrees, as examples, although alternatively, angles $\alpha_1$ and $\alpha_2$ may comprise other values.

The mobile docking station 462 of the display system 400 provides a stable support 464 for the mobile device 402, and provides an enlarged auxiliary screen 404 on which images for the mobile device 402 can be viewed. The size of the auxiliary screen 404 may be about the size of a laptop screen or larger in some embodiments, for example.

Figure 32:
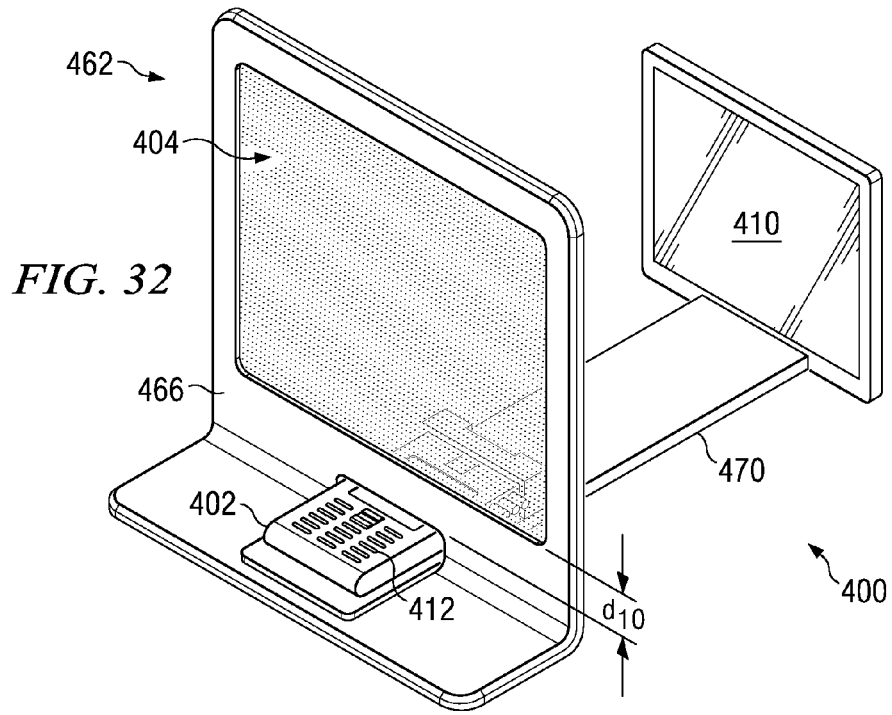
FIGS. 32 and 33 show front and rear perspective views, respectively, of a display system comprising a docking station in accordance with another embodiment.
Figure 33:
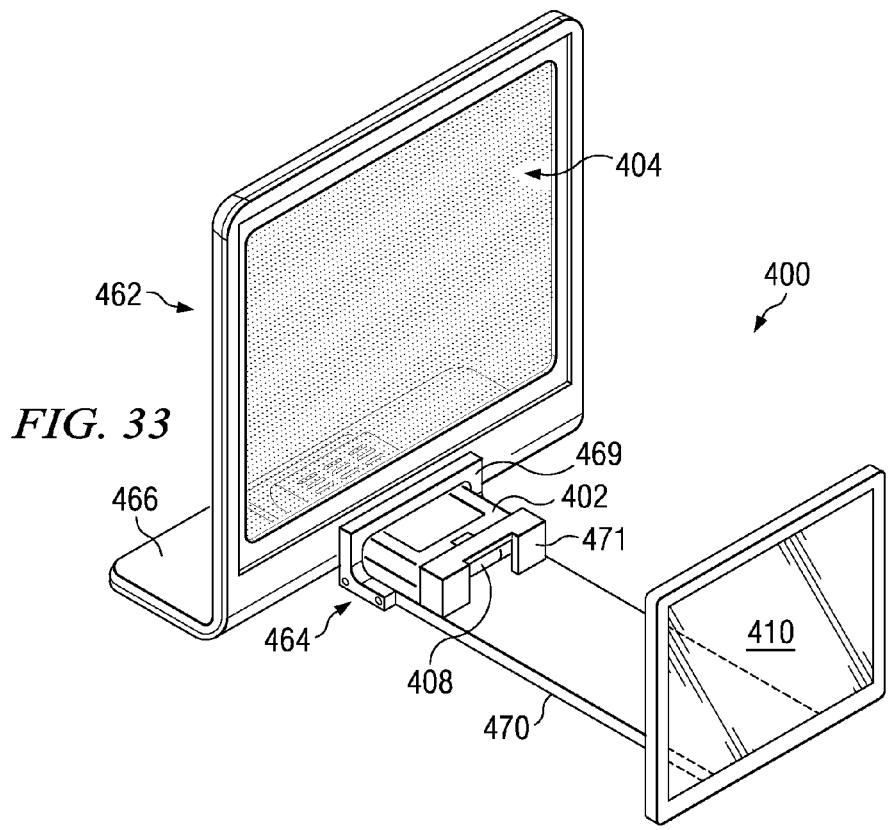

FIGS. 32 and 33 show front and rear perspective views, respectively, of a display system 400 in accordance with another embodiment. The docking station 462 is similar to the embodiment shown in FIGS. 30 and 31, with differences in the shape of the front portion 466 and dimension $d_{10}$, which provides a lowered chin of the front portion 466 of the docking station 462. Dimension $d_{10}$ may comprise only a few mm to about 10 mm in this embodiment, for example. The angle $\alpha_2$ (not labeled in FIGS. 32 and 33; see FIG. 30) of the front portion 466 of the docking station 462 to the horizontal surface may comprise about 91.5 degrees in this embodiment, as an example. Alternatively, dimension $d_{10}$ and angle $\alpha_2$ may comprise other values.

FIG. 33 illustrates optional features of a docking station 462 in accordance with an embodiment. A connecting device 469 may be used to couple the front portion 466 to the support 470. A mechanical stop 471 may be disposed on the connecting member 470 to position the mobile device 402 in the docking station 462. The support 464 for the mobile device 402 may include the connecting device 469 and mechanical stop 471, for example.

Figure 34:
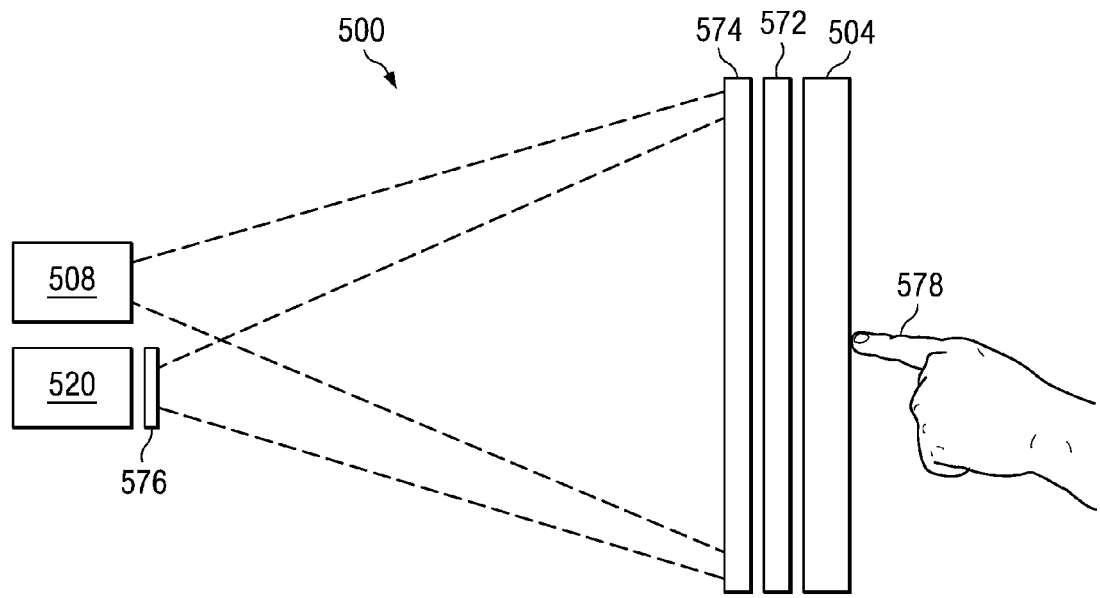
FIG. 34 is a block diagram illustrating an interactive auxiliary screen of a display system in accordance with an embodiment.

FIG. 34 is a block diagram illustrating an interactive auxiliary screen 504 comprising touch-screen capability in a display system 500 in accordance with an embodiment. The display system 500 is adapted to detect if the auxiliary screen 504 is touched, in some embodiments, and a mobile device is adapted to respond if the auxiliary screen 504 is touched. The auxiliary screen 504 may comprise a depolarization multi-touch screen, for example. The auxiliary screen 504 may comprise a rear projection display, with a polarizer 572 disposed proximate the auxiliary screen 504 and a depolarizer 574 disposed proximate the polarizer 572. The projector 508 of a mobile device (or a projector 508 of the display system 500, if the mobile device does not include a projector 508) is adapted to project images towards the auxiliary screen 504, and the camera 520 of the mobile device (or display system 500) is adapted to capture images from the auxiliary screen 504. An orthogonal polarizer 576, e.g., disposed in a polarization direction orthogonal to the polarization direction of the polarizer 574, is disposed between the camera 520 and the auxiliary screen 504. If a finger 578 or other object, such as a stylus or writing instrument, touches or comes into contact with the auxiliary screen 504, a polarized dark spot is detectable by the camera 520. The mobile device (not shown in FIG. 34) may be adapted to respond to the contact with the auxiliary screen 504, using the camera 520 and polarization elements 572, 574, and 576 for example.

Figure 35:
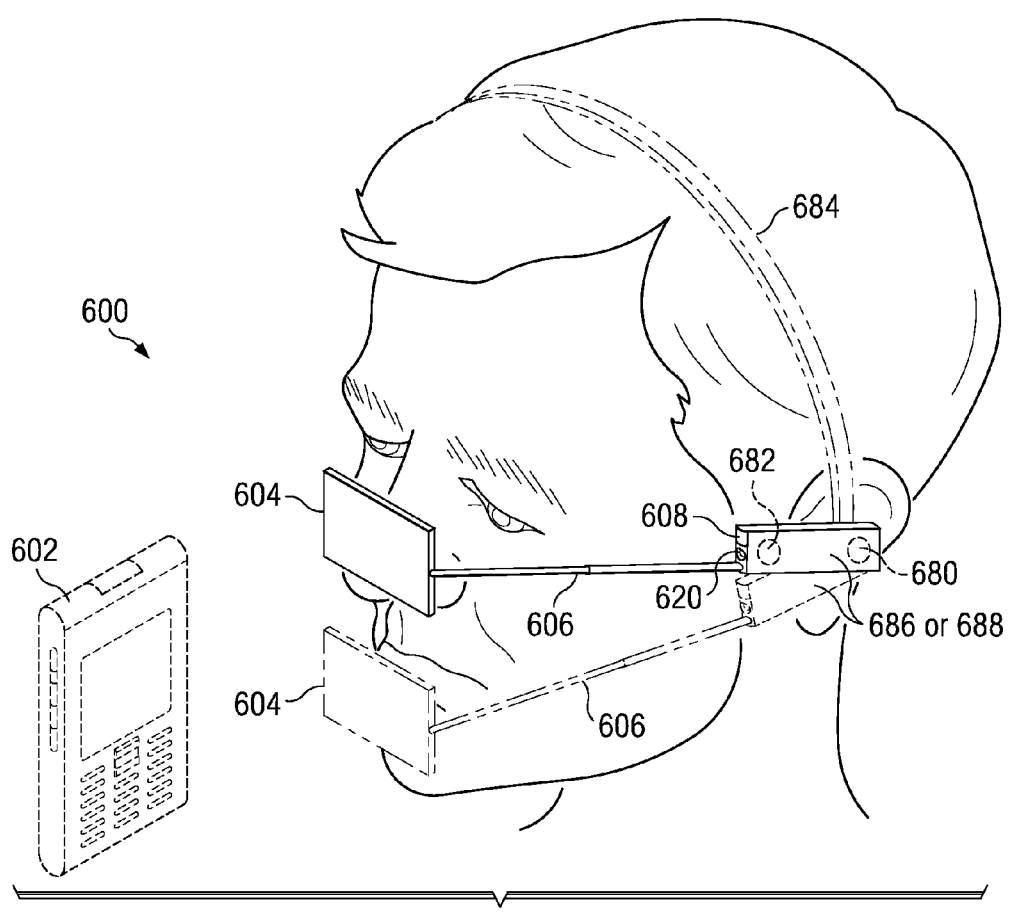
FIG. 35 illustrates an embodiment wherein the display system is coupleable to a head-mountable mobile device comprising a headset or earpiece.

FIG. 35 illustrates an embodiment wherein the display system 600 is coupleable or attachable to a mobile device comprising a head-mountable electronic device 686 or 688. The head-mountable electronic device 686 or 688 may comprise an earpiece, or the head-mountable electronic device 686 or 688 may comprise a headset or headphones, as shown in phantom, as examples. The head-mountable electronic device 686 may comprise an earpiece that is adapted to communicate using Bluetooth technology with a separate cell phone or mobile device 602, as shown in phantom, in some embodiments. Alternatively, the head-mountable electronic device 686 may be connected to a separate mobile device 602 using a wire or cable. In other embodiments, the head-mountable electronic device 688 may comprise an earpiece, headset, or headphones that include similar functions of a mobile device 602. Again, like numerals are used to refer to the various elements that were used to describe the previous figures, and to avoid repetition, each element is not described again herein.

The head-mountable electronic device 686 or 688 includes a speaker 680 disposed proximate the ear of the user and a microphone 682 disposed proximate the mouth of the user. The head-mountable electronic device 686 or 688 may include a mechanical device adapted to fit over the ear of the user, for example, not shown. The head-mountable electronic device 686 or 688 may alternatively comprise a headset or headphones that include a headband 684, shown in phantom, or other types of securing mechanisms for attaching the head-mountable electronic device 686 or 688 to the user's head. The head-mountable electronic device 686 or 688 may include a second earpiece (e.g., wherein the head-mountable electronic device 686 or 688 comprises headphones) for the other ear of the user, for example, not shown.

The display system 600 may include a connecting device 606 comprising a retractable arm or other type of connecting device described herein that is coupleable to the head-mountable electronic device 686 or 688 at one end. The auxiliary screen 604 is coupled to the opposite end of the connecting device 606. The connecting device 606 may be telescoping and/or may comprise miniature or altered versions of the connecting devices described herein for the other embodiments, for example. The connecting device 606 of the display system 600 may include a mechanism to provide a reverse telescoping counter balance, to maintain the center of gravity and comfortably elevate the auxiliary screen 604 without needing to rest the auxiliary screen 604 or other portion of the display system 600 on the user's nose, for example.

The auxiliary screen 604 is foldable to position into the view of one eye or both eyes of the user, as shown. The head-mountable electronic device 686 or 688 or the display system 600 may include projection optics adapted to project an image on the auxiliary screen 604.

Again, the head-mountable electronic device 686 may be adapted to produce images from a separate mobile device 602, shown in phantom, on the auxiliary screen 604 of the display system 600, e.g., using Bluetooth technology/signals or by a physical connection of the head-mountable electronic device 686 to the mobile device 602 using a cable or wiring. Images may be simultaneously viewed on the primary display screen of the separate mobile device 602 in these embodiments, for example.

In accordance with some embodiments, a head-mountable electronic device 688 may include or may comprise functions of a mobile device 602, such as cell phone capability. The connecting device 606 and auxiliary screen 604 may be detachable from the head-mountable electronic device 688, or the connecting device 606 and auxiliary screen 604 may be permanently attached to the head-mountable electronic device 688. The head-mountable electronic device 688 may not include a primary display screen in these embodiments; thus, the auxiliary screen 604 of the display system 600 may function as a primary display screen for the head-mountable electronic device 688, for example. In some embodiments, for example, a mobile device includes a head-mountable electronic device 688 and a display screen 604, the display screen being retractable from the head-mountable electronic device 688. The connecting device 606 is attachable between the head-mountable electronic device 688 and the display screen 604, wherein an image from the head-mountable electronic device 688 is producible on the retractable display screen 604.

The display system 600 may be integral to a head-mountable electronic device 686 or 688 as purchased, yet detachable if the user desires, for example. The display system 600 may alternatively be permanently attached to the head-mountable electronic device 686 or 688 in other embodiments, as another example.

Thus, in accordance with some embodiments, a display system 600 may be hung on a user's ear, e.g., attached to a head-mountable electronic device 686 or 688, similar to a Bluetooth headset. The head-mountable electronic device 686 or 688 may be adapted to lock in two angles with respect to the ear: in a lower position for speaking, shown in phantom in FIG. 35, wherein the connecting device 606 and auxiliary screen 604 may be retracted into the head-mountable electronic device 686 or 688; and in an upper position for viewing and listening, as shown in FIG. 35, for example. The auxiliary screen 604 may be positioned in a first position directly in front of at least one of the user's eyes in some embodiments, e.g., in front of one eye, similar to placing one side of a pair of eyeglasses in front of the user's face, when the auxiliary screen 604 is in use, as shown in FIG. 35. The auxiliary screen 604 may be placed in a second position shown in phantom in FIG. 35 away from at least one of the user's eyes, e.g., when the user is talking into the head-mountable electronic device 686 or 688. The connecting device 606, the auxiliary screen 604, and optionally also the earpiece 602 may be moved to the two locking positions, for example. Alternatively, only the connecting device 606 and the auxiliary screen 604 may be moved or rotated into the two positions, so that the user may continue talking into the microphone 682.

If the display system 600 includes an auxiliary screen 604 comprising a projection screen, the display system 600 includes an integrated projector 608 that projects images from the ear of the user to the folding projection screen 604. Alternatively, if the auxiliary screen 604 comprises other types of display screens, wiring may be included proximate or within the connecting device 606 to electrically couple to the auxiliary screen 604, for example.

The auxiliary screen 604 may be substantially translucent in some embodiments, to allow a reflection from the projector 608 to be seen, yet also allow some light from the background (e.g., behind the auxiliary screen 604) to pass through the auxiliary screen 604. The image visible on the auxiliary screen 604 may also intentionally be blurred in these embodiments to account for far sighted focus, for example. A blurred image with far sighted focus capability may be used for augmented reality viewing, e.g., wherein the human optical system of the user is focused on objects further out than the auxiliary screen 604. Thus, the novel display system 600 may be implemented as an augmented reality system in some embodiments.

The display system 600 may also include a camera 620 in the embodiments wherein the display system 600 is implemented as an augmented reality system, e.g., in the head-mountable electronic device 686 or 688, and computer vision algorithms may be included in the display system 600 or head-mountable electronic device 686 or 688 and used to determine how far away recognized objects are, e.g., based on information received by the camera 620. The information from the computer vision algorithms may be used to enable a virtual overlay to be projected onto the substantially translucent material of the auxiliary screen 604, and the images would need to be defocused, based on their known distance from the viewer, so that the images would appear focused when viewing the real-world objects through the glass and with the other eye. Thus, potentially different blurring functions may be achieved on individual objects, depending on where they appear in the real world scene. However, to avoid nausea because of the focal disparity of a single eye viewing interface, the auxiliary screen 604 may be positioned in front of both eyes or the other eye may covered with a patch when using the display system 600 in the augmented reality system mode, for example.

The various components of the display systems 100, 200, 300, 400, 500, and 600 may comprise passive components in some embodiments, e.g., requiring no power. Alternatively, components of the display systems 100, 200, 300, 400, 500, and 600 may require power. The display systems 100, 200, 300, 400, 500, and 600 may be plugged into a connector of the mobile devices 102, 202, 302, 402, or 602 or a universal serial bus (USB) port of the mobile devices 102, 202, 302, 402, or 602 for electrical connection and/or for obtaining power, as examples. Alternatively, the display systems 100, 200, 300, 400, 500, and 600 may include a power source such as a battery, an A/C connection for connecting to an A/C power source, or a DC connection for connecting to a DC power source, not shown in the drawings.

The mechanical and electrical connection to the novel auxiliary screens 104, 204, 304, 404, 504, and 604 described herein may comprise metallic connectors, elastomeric connectors, and/or wireless transmission, as examples. The auxiliary screens 104, 204, 304, 404, 504, and 604 may be powered using inductive powering in some embodiments, e.g., using a wireless power source, for example.

The connections to the auxiliary screens 104, 204, 304, 404, 504, and 604 may be based on several standards for video display, such as a high-definition multimedia interface (HDMI), micro-universal serial bus (USB), USB Video Class (UVC), a printed circuit board (PCB) bus interface such as a mobile industry processor interface (MIPI) display serial interface (DSI), Bluetooth such as BT ultra low power (ULP), or WIFI, as examples, although alternatively, the connections to the auxiliary screens 104, 204, 304, 404, 504, and 604 may also be based on other standards.

The auxiliary screens 104, 204, 304, 404, 504, and 604 may be powered or charged using inductive powering or charging, based on standards such as 13.56 MHz near field communication (NFC) antennas or other inductive power standards. If a ferrite backer is used on a receiving system (i.e., such as one manufactured by TDK Corporation) of the mobile devices, display systems, or auxiliary screens, a 200 mW transceiver can induce about 8 mA of current at about 3 V within about a centimeter, for example; thus, up to about a 4 Watt inductive transceiver may be used in this band. However, the relationship for inductive energy drop-off is $1/r^3$, wherein r is the radius from the wireless power source, thus, the inductively coupled device needs to be relatively close to the wireless power source in this embodiment.

At least a portion of the display systems 100, 200, 300, 400, 500, and 600 may be adapted to function as at least a portion of an antenna of the mobile devices 102, 202, 302, 402, and 602. At least a portion of the connecting device or the auxiliary screen 104, 204, 304, 404, 504, or 604 may be adapted to function as at least a portion of an antenna of the mobile device 102, 202, 302, 402, and 602. For example, antenna wiring or conductive material (not shown) may be included in portions of the display systems 100, 200, 300, 400, 500, and 600 and may be electrically coupled to the antenna or transceiver circuitry of the mobiles devices 102, 202, 302, 402, and 602. The antenna wiring may comprise the retractable arms 117, or may be disposed along edges of the auxiliary screens 104, 204, 304, 404, or 504 or other portions of the display systems 100, 200, 300, 400, 500, and 600. Thus, the display systems 100, 200, 300, 400, 500, and 600 may improve signal quality of the mobile devices 102, 202, 302, 402, and 602 in some embodiments.

The display systems 100, 200, 300, 400, 500, and 600 may comprise accessory devices that are purchased separately from the mobile devices 102, 202, 302, 402, or 602. Alternatively, the display systems 100, 200, 300, 400, 500, and 600 may be sold along with the purchase of the mobile devices 102, 202, 302, 402, and 602 and electronic devices 686, yet are removable. The display systems 100, 200, 300, 400, 500, and 600 are easily transported and are easy to attach to the mobile devices 102, 202, 302, 402, and 602 or electronic devices 686. In other embodiments, the display systems 100, 200, 300, 400, 500, and 600 may be integral to the mobile devices 102, 202, 302, 402, and 602 or electronic device 686, for example.

In accordance with some embodiments, novel display systems 100, 200, 300, 400, 500, and 600 for mobile devices 102, 202, 302, 402, 502, and 602 are provided. Embodiments also include mobile devices 102, 202, 302, 402, 502, and 602 including the display systems 100, 200, 300, 400, 500, and 600 described herein. Other embodiments include methods of manufacturing the display systems 100, 200, 300, 400, 500, and 600 described herein and methods of manufacturing mobile devices 102, 202, 302, 402, 502, and 602 and electronic device 686 that include the novel display systems 100, 200, 300, 400, 500, and 600 described herein. Embodiments of the present invention also include methods of projecting images from mobile devices 102, 202, 302, 402, 502, and 602 to the display systems 100, 200, 300, 400, 500, and 600 and producing images on the display systems 100, 200, 300, 400, 500, and 600 described herein.

Advantages of embodiments described herein include providing novel display systems 100, 200, 300, 400, 500, and 600 for mobile devices 102, 202, 302, 402, and 602. Several different designs of display systems 100, 200, 300, 400, 500, and 600 are described that extend a ninety degree field of view from an integrated optical system of a mobile device 102, 202, 302, 402, and 602. Images are projected or produced from the mobile device 102, 202, 302, 402, and 602 while a user maintains access to the keyboard 112 and 312 of the mobile devices 102, 202, 302, 402, and 602. Embodiments of the invention are particularly useful in cell phones, calculators, smart phones, head-mounted electronic devices, or other mobile devices 102, 202, 302, 402, and 602 that have advanced features such as the ability to play DVDs or movies, MP4 movies, slideshows of photographs, games, or other entertainment features.

The novel display systems 100, 200, 300, 400, 500, and 600 allow a user of a mobile device 102, 202, 302, 402, and 602 to view a larger image than an image visible on a primary display screen 132 of the mobile device 102, 202, 302, 402, or 602 providing ease of viewing and the ability for several viewers to see the auxiliary screens 104, 204, 304, 404, 504, and 604 at once, for example. Bright, focused presentations may be given from a mobile device 102, 202, 302, 402, and 602 without requiring a separate reflected surface. The footprints of the unfolded auxiliary screens 104, 204, 304, 404, 504, and 604 may fall within a laptop footprint in some embodiments, for example.

Although the embodiments and their advantages have been described in detail, it should be understood that various changes, substitutions and alterations can be made herein without departing from the spirit and scope of the invention as defined by the appended claims. Furthermore, the embodiments described herein may be implemented separately or in any combination with each other. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A display system for a portable electronic device having a primary display screen and a projector with projection optics integral with the electronic device, the display system comprising:
   an auxiliary screen;
   a canister coupleable to the electronic device; and
   an extending member attached to the canister and auxiliary screen, the extending member configured for movement between a retracted position enclosing the auxiliary screen and the extending member within the canister, and an extended position positioning the auxiliary screen for display of images projected by the projector;
wherein the electronic device and the canister are both generally planar, and the canister is coupleable in general coplanar relationship to the electronic device.

2. The display system of claim 1, wherein the electronic device has a width and length, and the canister has a width and length substantially the same as the width and length of the electronic device.

3. The display system of claim 2, wherein the extending member in extended position places the auxiliary screen at a distance of at least the length of the electronic device from the projection optics of the projector.

4. The display system of claim 3, wherein the auxiliary screen is attached to the extending member for pivoting the auxiliary screen into an image displaying position substantially perpendicular to the plane of the canister when the extending member is in the extended position.

5. The display system of claim 4, wherein the auxiliary screen is attached to the extending member for rotating the auxiliary screen relative to the extending member to bring the auxiliary screen into the image displaying position.

6. The display system of claim 5, wherein the auxiliary screen includes foldable flaps.

7. The display system of claim 6, wherein the canister includes grooves on interior side surfaces for containing and guiding the extending member and the auxiliary screen as the extending member is moved between the retracted and extended positions.

8. The display system of claim 7, wherein the electronic device includes a battery compartment door, and the canister is configured to couple proximate the battery compartment door.

9. The display system of claim 8, wherein the electronic device includes a keyboard, and the canister, auxiliary screen and extending member do not obstruct user access to the keyboard when the extending member is in either of the retracted or extended position.

10. The display system of claim 9, wherein the canister has an opening at an end through which the extending member and the auxiliary screen pass when the extending member is moved between the refracted and extended positions.

11. The display system of claim 10, wherein the canister includes a notch proximate the opening, and at least one of the extending member or auxiliary screen has a finger tab configured to assist pulling the extending member or auxiliary screen out of the canister through the opening.

12. The display system of claim 11, wherein the electronic device is a cell phone.

13. The display system of claim 1, wherein the auxiliary screen is attached to the extending member for pivoting the auxiliary screen into an image displaying position substantially perpendicular to the plane of the canister when the extending member is in the extended position.

14. The display system of claim 1, wherein the electronic device includes a battery compartment door, and the canister is configured to couple proximate the battery compartment door.

15. The display system of claim 1, wherein the canister has an opening at an end through which the extending member and the auxiliary screen pass when the extending member is moved between the retracted and extended positions.

16. A display system for a portable electronic device having a primary display screen and a projector with projection optics integral with the electronic device, the display system comprising:
an auxiliary screen;
a canister coupleable to the electronic device; and
an extending member attached to the canister and auxiliary screen, the extending member configured for movement between a retracted position enclosing the auxiliary screen and the extending member within the canister, and an extended position positioning the auxiliary screen for display of images projected by the projector;
wherein the electronic device has a width and length, and the canister has a width and length substantially the same as the width and length of the electronic device.

17. The display system of claim 16, wherein the extending member is extended position places the auxiliary screen at a distance of at least a length of the electronic device from the projection optics of the projector.

18. A display system for a portable electronic device having a primary display screen and a projector with projection optics integral with the electronic device, the display system comprising:
an auxiliary screen;
a canister coupleable to the electronic device; and
an extending member attached to the canister and auxiliary screen, the extending member configured for movement between a retracted position enclosing the auxiliary screen and the extending member within the canister, and an extended position positioning the auxiliary screen for display of images projected by the projector;
wherein the auxiliary screen is attached to the extending member for rotating the auxiliary screen relative to the extending member to bring the auxiliary screen into the image displaying position.

19. A display system for a portable electronic device having a primary display screen and a projector with projection optics integral with the electronic device, the display system comprising:
an auxiliary screen;
a canister coupleable to the electronic device; and
an extending member attached to the canister and auxiliary screen, the extending member configured for movement between a retracted position enclosing the auxiliary screen and the extending member within the canister, and an extended position positioning the auxiliary screen for display of images projected by the projector;
wherein the canister includes grooves on interior side surfaces for containing and guiding the extending member and the auxiliary screen as the extending member is moved between the retracted and extended positions.

* * * * *